US008645319B2

(12) United States Patent
Iwaki et al.

(10) Patent No.: US 8,645,319 B2
(45) Date of Patent: Feb. 4, 2014

(54) INFORMATION PROCESSING SYSTEM, DATA UPDATE METHOD AND DATA UPDATE PROGRAM

(75) Inventors: Masashi Iwaki, Tokyo (JP); Takeshi Anzai, Yokohama (JP); Yuki Sugimoto, Sagamihara (JP); Katsushi Yako, Yokohama (JP); Shinichi Kawamoto, Tokyo (JP); Natsuko Sugaya, Inagi (JP)

(73) Assignee: Hitachi, Ltd., Tokyo (JP)

( * ) Notice: Subject to any disclaimer, the term of this patent is extended or adjusted under 35 U.S.C. 154(b) by 479 days.

(21) Appl. No.: 12/542,153

(22) Filed: Aug. 17, 2009

(65) Prior Publication Data
US 2010/0076939 A1 Mar. 25, 2010

(30) Foreign Application Priority Data

Sep. 5, 2008 (JP) .................................. 2008-228769

(51) Int. Cl.
*G06F 17/30* (2006.01)
(52) U.S. Cl.
USPC ........... 707/610; 707/623; 707/690; 709/203; 709/219
(58) Field of Classification Search
USPC ........... 707/690, 999.201, 610, 623, 999.107; 709/203, 219
See application file for complete search history.

(56) References Cited

U.S. PATENT DOCUMENTS

| 6,446,092 | B1 * | 9/2002 | Sutter ..................... 707/999.203 |
| 6,516,314 | B1 * | 2/2003 | Birkler et al. ................. 707/621 |
| 7,461,230 | B1 * | 12/2008 | Gupta et al. .................. 711/170 |
| 2003/0182327 | A1 * | 9/2003 | Ramanujam et al. .. 707/999.204 |
| 2004/0034670 | A1 * | 2/2004 | Bhuyan .................. 707/999.204 |
| 2004/0172421 | A1 * | 9/2004 | Saito et al. ................. 707/999.2 |
| 2004/0193625 | A1 * | 9/2004 | Sutoh et al. ................. 707/999.1 |
| 2005/0193024 | A1 * | 9/2005 | Beyer et al. ................. 707/999.2 |
| 2006/0218224 | A1 * | 9/2006 | Agrawal et al. ............... 709/201 |
| 2007/0038682 | A1 * | 2/2007 | Kulesza et al. ........ 707/999.202 |
| 2007/0156781 | A1 * | 7/2007 | Kapoor et al. ......... 707/999.202 |
| 2008/0184219 | A1 * | 7/2008 | Matsumoto ................... 717/170 |
| 2008/0189340 | A1 * | 8/2008 | Blea et al. .............. 707/999.204 |

FOREIGN PATENT DOCUMENTS

| JP | 051433373 | 6/1993 |
| JP | 11-007403 | 1/1999 |
| JP | 2003242016 | 8/2003 |

OTHER PUBLICATIONS

Paul R. Johnson and Robert H. Thomas. RFC677: The maintenance of duplicate databases. The Network Working Group. Jan. 1976. Retrieved on Nov. 8, 2012 from http://tools.ietf.org/pdf/rfc677.pdf.*

(Continued)

*Primary Examiner* — Leslie Wong
(74) *Attorney, Agent, or Firm* — Brundidge & Stanger, P.C.

(57) ABSTRACT

An information processing system, a data update method and a data update program are disclosed. In a data base system of master-slave configuration, the update result can be accessed also on slave side with the access request immediately after the particular update. The data base system DBS includes a master DB computer and at least a slave DB computer. The slave DB computer judges from the count on an update counter table whether the update log received from the master DB computer is to be reflected in a duplicate data base or not. Thus, the lost update problem is solved while at the same time realizing a high-speed process.

12 Claims, 26 Drawing Sheets

(56) References Cited

OTHER PUBLICATIONS

Robert H. Thomas. A majority consensus approach to concurrency control for multiple copy databases. ACM Transactions on Database Systems. Jun. 1979. Retrieved on Nov. 8, 2012 from http://citeseerx.ist.psu.edu/viewdoc/download?doi=10.1.1.92.5721&rep=repl&type=pdf.*

Cal Henderson, "Building Scalable Web Sites", published by O'Reilly Media, Inc., May 2006, pp. 232-234.

* cited by examiner

600 — AUCTION AMOUNT

| COMMODITY ID | PRICE | COUNTER ID |
|---|---|---|
| ... | | |
| 208 | 300 | 789 |
| 209 | 150 | 790 |
| ... | | |

610 — COMMODITY INFORMATION

| COMMODITY ID | NAME | EXHIBITOR ID | COUNTER ID |
|---|---|---|---|
| ... | | | |
| 208 | CABINET | 57322 | 538 |
| 209 | CLOCK | 14383 | 861 |
| ... | | | |

| COUNTER ID | UPDATE COUNTER |
|---|---|
| ... | |
| 790 | 1 |
| 861 | 2 |
| ... | |

FIG.27

AUCTION AMOUNT 2700

| COMMODITY ID | PRICE | UPDATE COUNTER |
|---|---|---|
| ... | ... | ... |
| 208 | 300 | 0 |
| 208 | 150 | 1 |
| ... | ... | ... |

COMMODITY INFORMATION 2710

| COMMODITY ID | NAME | EXHIBITOR ID | UPDATE COUNTER |
|---|---|---|---|
| ... | ... | ... | ... |
| 208 | CABINET | 57322 | 0 |
| 208 | CLOCK | 14383 | 0 |
| ... | ... | ... | ... |

INFORMATION PROCESSING SYSTEM, DATA UPDATE METHOD AND DATA UPDATE PROGRAM

BACKGROUND OF THE INVENTION

This invention relates to a technique for securing the consistency of data in a data base system of a master-slave configuration in which a duplicate of the original data base held in a master DB (data base) computer (hereinafter sometimes referred to simply as "the master") is held in a slave DB computer (hereinafter sometimes referred to simply as "the slave").

In a large-scale system in which data is accessed and updated, the data base often forms a bottleneck against the performance. This is caused by the fact that a great amount of requests generated from a multiplicity of applications are concentrated on a single DB computer to such a degree that all the requests cannot be processed (punctured). In such a case, the common practice is to add a DB computer to hold the same data as the original DB computer and thus to balance the load by distributing the requests from, the applications.

In a system having a plurality of DB computers, a method is required in which, upon reception of an update request, the update is reflected in all the DB computers. For this purpose, an ordinary DBMS (Data Base Management System) has the function called the replication. The "replication" is the function by which an update generated in a given DBMS is reflected in other DBMSs by transmitting an update log, etc. storing the update information.

Two methods described below are conceivable to update the data of the data base system utilizing the replication. In the first method, an update request is accepted by all the DB computers, and the update log is transmitted between the DB computers to reflect the update by each other. In the second method, an update request is accepted only by one predetermined DB computer (master), and the data of the other DB computers (slaves) is updated only by the update log transmitted from the master.

The first method, can balance the load of the update process, and therefore, superior in the processing performance. This method, however, may cause a inconsistency of the data base.

The situation in which this inconsistency is generated is explained with reference to FIG. 25. Assume that two DB computers 2500, 2510 initially hold the data of the same value "300" (reference numerals 2501, 2511). In the case where an update request 2502 to add "100" to the data is transmitted, to the DB computer 2500, the data held by the DB computer 2500 takes the value "400" (reference numeral 2504). Assuming that the update request 2512 to add "150" to the data is transmitted to the DB computer 2510 immediately after that, the data held by the DB computer 2510 assumes the value "450" (reference numeral 2514).

After that, the update log for the data value "400" is transmitted from the DB computer 2500 to the DB computer 2510 (reference numeral 2505), while the update log for the data value "450" is transmitted from the DB computer 2510 to the DB computer 2500 (reference numeral 2515). As a result, the DB computer 2500 reflects the update log accepted, and assumes the data value "450" (reference numeral 2506), while the DB computer 2510 reflects the update log accepted and assumes the data value "400" (reference numeral 2516). In this way, the inconsistency occurs in which the data held in the two DB computers 2500, 2510 have different values from, each other.

JP-A-11-7403 discloses a technique to determine which update is given, priority by utilizing the header information attached to the update log to secure that all the DB computers finally hold the same content of the data. According to this technique, the two DB computers each hold only one of the data values "400" and "450" and thus no inconsistency is generated in the aforementioned case shown in FIG. 25. From the viewpoint from the user of the data base system configured of the two DB computers 2500, 2510, however, the result of the transmission of the update requests "+100" and "+150" to the original data "300" is required to be "550". The value "400" or "450", whichever is the result, has lost one of the two update requests. This problem is called "the lost update", and cannot be avoided by the method disclosed in JP-A-11-7403.

According to the second method described above, on the other hand, the update is always processed by the master, and therefore, the "lost update" problem is avoided. This method is disclosed in Cal Henderson: "Building Scalable Web Sites", published by O'Reilly Media, Inc., May 2006, p.232-234. In this method, however, the slave reflects the update by receiving the update log from the master, and therefore, it may take considerable time before the update is reflected in all the slaves from the time of completion of the update process. Also, since the load of the update process cannot be balanced, the update process performance is not improved even by increasing the number of the DB computers.

Each of the two methods described above has both merits and demerits in respect of the data consistency and the process performance, and the appropriate one of the methods is required to be selected in accordance with the conditions to be met. In a system providing the Web service such as SNS (Social Network Service) or the e-commerce, an increased number of users generates a great amount of requests to the data base, and therefore, the requirement to construct a data base system of a plurality of DB computers is increased. In many of these systems, an update conflict, if generated, is not permitted to cause a lost update, and therefore, a method is often employed in which an update is accepted only by the master and reflected asynchronously.

In the aforementioned data base system of master-slave configuration in which the update is accepted only by the master and reflected asynchronously by transmitting the update log to the slaves, however, it takes considerable time before the update is reflected in the slave after the update request is issued. This poses the problem that despite the normal completion of the update request, the old data before the update may be accessed by the immediately subsequent access request to the slave. This indicates that in the service such as the on-line auction, the inconvenience may occur in which the bid, if successful, is immediately followed by the display of the data before the bid.

Also, the transmission of the access request to the master, though accessible to the latest update result, poses the problem that a part of the access requests are centrally processed by the master in addition to the update requests, and therefore, the effect of the load balance which otherwise might be achieved by the distributive request process is reduced.

SUMMARY OF THE INVENTION

This invention has been achieved in view of the problems described above, and the object thereof is to provide a data base system of master-slave configuration in which the update result can be accessed also on the slave side with the access request immediately following the particular update (i.e. the data before the update is prevented from being accessed).

According to this invention, there is provided an information processing system comprising a first information processing unit for managing the original data base constituting a mass of data, and at least one second information processing unit for managing the duplicate data base as a duplicate of the original data base, wherein the update log storing the update information generated in the original data base of the first information processing unit is transmitted to the second information processing unit and reflected in the duplicate data base, wherein, the second information processing unit includes a request processing unit which, upon acceptance of an update request from an external computer, transmits the update request to the first information processing unit to update the original data base while at the same time updating the duplicate data base of the second Information processing unit, an update information management unit for managing by checking, for each data in the duplicate data base, whether the update log corresponding to the accepted update request is received from the first information processing unit or not, and an update reflection judgment unit which, upon acceptance of a new update log from the first information processing unit, judges whether the particular update log is to be reflected in the duplicate data base or not based on the information stored in the particular update log and the information managed by the update information management unit, and upon judgment that the particular update log is so reflected, reflects the update content of the update log in the duplicate data base. The remaining means are described later.

In the data base system of master-slave configuration according to this invention, the update result can be accessed also on the slave side with the access request immediately after the particular update.

BRIEF DESCRIPTION OF THE DRAWINGS

FIG. 6 shows a part of examples of the duplicate data base according to the first embodiment of the invention.

FIG. 7 shows a part of examples of the update counter table according to the first embodiment of the invention.

FIG. 27 shows a part of examples of the duplicate data base according to a second embodiment of the invention.

DETAILED DESCRIPTION OF THE INVENTION

The best mode for carrying out the invention (hereinafter referred, to as the "embodiment"), comparative examples, and first to fourth embodiments are explained below with reference to the drawings (appropriately including other drawings than shown).

COMPARATIVE EXAMPLE

First, to facilitate the understanding of the first to fourth embodiments of the invention, a comparative example is explained. Incidentally, in the data base system according to this invention, the update requests are centrally processed by the master while at the same time being processed by the slaves. In the process, the simultaneous updating of all the slaves would extremely deteriorate the update process performance, and therefore, the update requests are distributed among the slaves so that only the slave that has accepted the update request is updated at the same time as the master. The update is reflected in other slaves by transmitting the update log from the master to the slaves as in the prior art. In this way, by transmitting the update request and the access request to the same slave, the update request result can be accessed with the immediately following access request.

Figure 26:
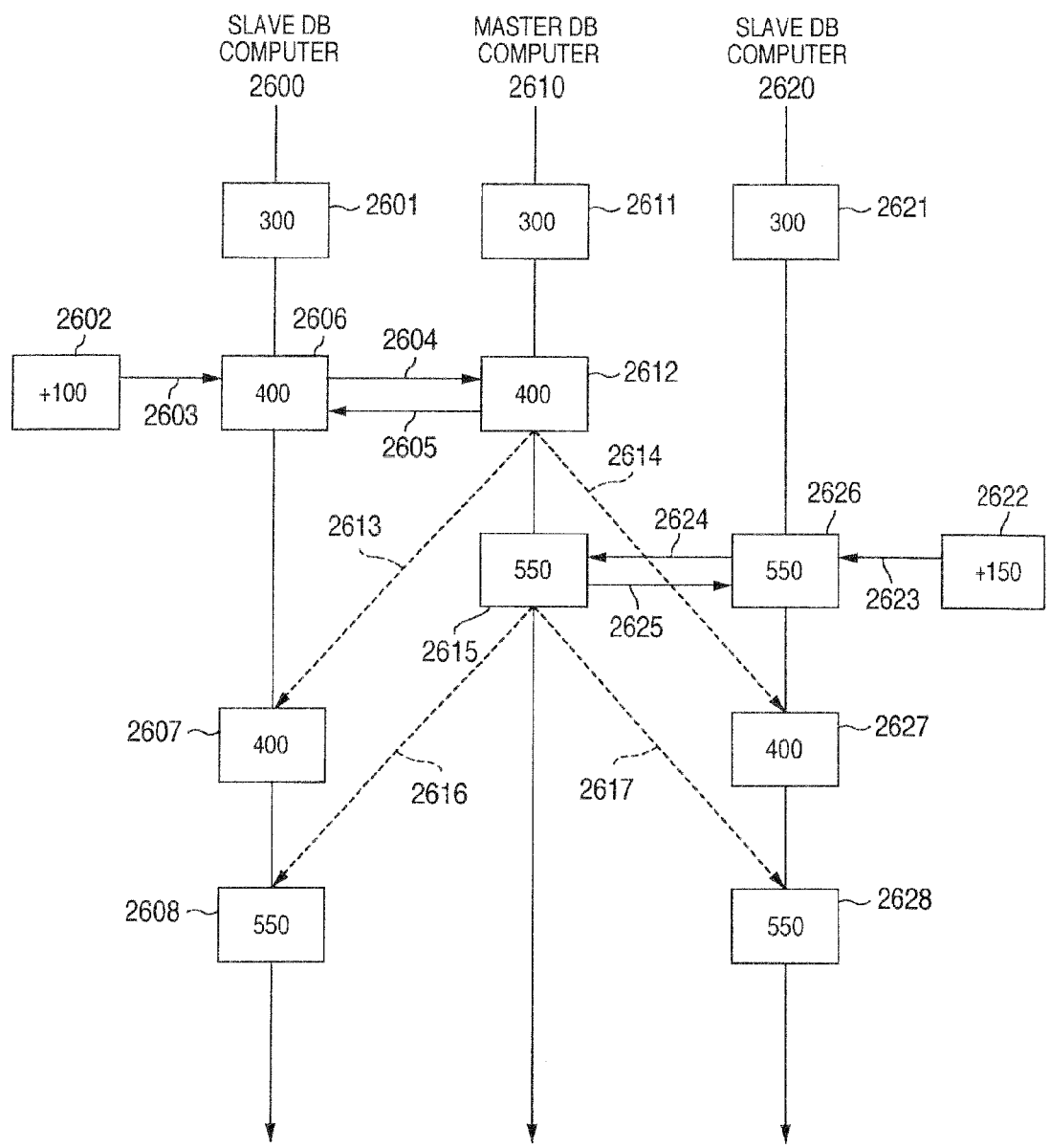
FIG. 26 shows an example of the data change in the case where update requests are generated successively in the two slave DB computers and reflect all the update logs transmitted from the master.

This process poses the problem, however, that the data assuming the latest value by the update process is returned to the old value by reflecting the late arriving update log. This problem is explained with reference to FIG. 26. As shown in FIG. 26, consider a data base system configured of a master DB computer 2610 and two slave DB computers 2600, 2620.

Initially, all the DB computers hold the data of the same value "300" (reference numerals 2601, 2611 and 2621). Assume that the update request 2602 to add "100" to the data is transmitted to the slave DB computer 2600 (reference numeral 2603), and further transmitted to the master DB computer 2610 (reference numeral 2604). As a result, the value of the data held in the master DB computer 2610 is updated to "400" (reference numeral 2612), and so is the value of the data held in the slave DB computer 2600 to "400" (reference numerals 2605, 2606).

Next, assume that the update request 2622 to add "150" to the data is transmitted to the slave DB computer 2620 (reference numeral 2623) and further to the master DB computer 2610 (reference numeral 2624). As a result, the value of the data held in the master DB computer 2610 is updated to "550" (reference numeral 2615), and so is the value of the data held in the slave DB computer 2620 to "550" (reference numerals 2625, 2626). Assuming that the update log to update the data value to "400" arrives late after these update processes (reference numerals 2613, 2614), the data value of the slave DB computer 2620, in spite of the latest value "550", would return to the old value "400" (reference numeral 2627).

In order to solve this problem, the data base system according to this invention checks, by the update counter table or the like, whether the update log corresponding to the update request received by the slave has already been received from the master. Once the slave accepts a given update log (referred to as "the update log A") from the master, the update log reflection judgment unit 235 (the update reflection judgment unit in FIG. 2) confirms, with reference to the update counter table, whether the update log corresponding to the update request received by the slave is already received from the master or not, and if not yet received, discards the accepted update log A, while if already received, reflects the accepted, update log A. As a result, the late arriving old update log is discarded without being reflected and the data return to the old value can be avoided (as described in more detail later).

First Embodiment

First, the hardware configuration according to the first embodiment of the invention is explained with reference to FIG. 1.

The data base system DBS (the information processing system) according to the first embodiment of the invention is configured of a master DB computer 120 (the server, the first information processing unit, the first data base computer, the data base computer), at least one slave DB computer 130 (the server, the second information processing unit, the second data base computer). At least one client computer 100 (external computer) is to activate the application which uses the data base system DBS. The client computer 100, the master DB computer 120 and the slave DB computer 130 are interconnected through a communication network 110.

The client computer 100 includes a network interface 102, a CPU (central processing unit) 103 and a main storage unit 104 interconnected by a bus 101, and is connected to the communication network 110 by the network interface 102. The main storage unit 104 holds various programs and the data used by the programs, and for example, is a memory. The CPU 103 executes the various programs held in the main storage unit 104.

The master DB computer 120 includes a network interface 122, a CPU 123, a main storage unit 124 and a disk interface 125 interconnected by a bus 121, and is connected to the communication network 110 by the network interface 122 and to an external storage unit 126 by the disk interface 125. The main storage unit 124 holds various programs and the data used by the programs, and for example, is a memory. The external storage unit 126 holds the data used by the programs. The CPU 123 executes the various programs held in the main storage unit 124.

The slave DB computer 130, which includes a network interface 132, a CPU 133, a main storage unit 134 and a disk interface 135 interconnected by a bus 131, is connected to the communication network 110 by the network interface 132 on the one hand and to an external storage unit 136 by the disk interface 135 on the other hand. The main storage unit 134 holds various programs and the data used by the programs, and is, for example, a memory. The external storage unit 136 holds the data used by the programs. The CPU 133 executes the various programs held in the main storage unit 134.

Next, the module (the functional unit of software) according to the first embodiment of the invention is explained with reference to FIG. 2.

The client computer 100 is for activating the application using the data base system DBS and includes a request transmission unit 200. The request transmission unit 200 selects one of the slave DB computer(s) 130 and transmits a request to the particular slave DB computer 130. The request takes the form of a typical SQL (structured query language) query.

The master DB computer 120 is an ordinary DBMS having the replication function, and includes a master request processing unit 220 and an update log transmission unit 221. The external storage unit 126 of the master DB computer 120 holds an update log buffer 222 and an original data base 223. The master request processing unit 220 accepts, analyzes and processes the request transmitted thereto from the slave DB computer 130. The update log transmission unit 221 monitors the update log buffer 222, and whenever the update log is added, transmits it to all the slave DB computers 130. The update log buffer 222 stores the update log describing the contents of the update effected in the master DB computer 120. The original data base 223 stores the data (for example, the auction amount table 300 and the commodity information table 310 described later) accessed and updated by the user by way of the data base system DBS. The original data base 223 is typically a relational data base with at least one data set making up a row data and stores at least one table with an arrangement of the row data. The server information table 224 is one of the tables stored in the original data base 223, and stores the information on the slave DB computer 130.

The slave DB computer 130 is for processing the request from, the client computer 100, and includes a request processing unit 230, a server information provision unit 231, an update counter increment unit 232 (update information management unit 2320), an update counter decrement unit 234 (update information management unit 2320), an update log reflection judgment unit 235, an update log receiving unit 236 and a server information judgment unit 237. The main storage unit 134 holds an update counter table 233 (update information management unit 2320), and the external storage unit 136 holds an update log buffer 222a (222) and a duplicate data base 233.

The request processing unit 230 accepts, analyzes and processes the request from the client computer 100. The request processing unit 230 sometimes transmits the request to the master DB computer 120 during the process. The server information provision unit 231 transmits the update request for updating the data in the server information table 224 to the master DB computer 120. The update counter increment unit 232 increments the update counter (hereinafter sometimes referred to simply as "the counter") of the update counter table 232 by "1". The update counter table 233 stores the counter corresponding to the row data of the duplicate data base 238.

The update counter decrement unit 234 decrements the counter of the update counter table 233 by "1". The update log reflection judgment unit 235 judges whether the update log is reflected or not, and in the case where the update log is reflected (when the counter is "0"), updates the duplicate data base 238. Specifically, in the slave DB computer 130, the duplicate data base 233 thereof is updated, and the update data (hereinafter referred to as "the update data A") is transmitted to the master DB computer 120. Then, the counter of the update counter table 233 is set to "1", and upon acceptance of the update log for the update thereof from the master DB computer 120, the counter in the updated counter table 233 is set to "0". The master DB computer 120 reflects, in the order of reception, the update data received from the slave DB computers 130. As long as the counter in the update counter table 233 thereof is "1", therefore, the slave DB computer 130 should not reflect the update log for the particular data received, from the master DB computer 120. This is by reason of the fact that the update log is the data older than the update data A, and the reflection thereof might cause a data inconsistency. This is described in more detail later with reference to FIGS. 9, 13 and 24.

The update log receiving unit 236 receives the update log transmitted thereto from the update log transmission unit 221, and adds it to the update log buffer 222a. The server information judgment unit 237 monitors the update log buffer 222a, and whenever the update log is added, retrieves and analyzes it thereby to manage the server information of the update log (described in detail later with reference to FIG. 12). The duplicate data base 238 stores the counter ID (IDentification) for each row data in addition to the duplicate of the data other than the server information table 224 of the original data base 223 (for example, the auction amount table 600 and the commodity information table 610 described later).

Figure 2:
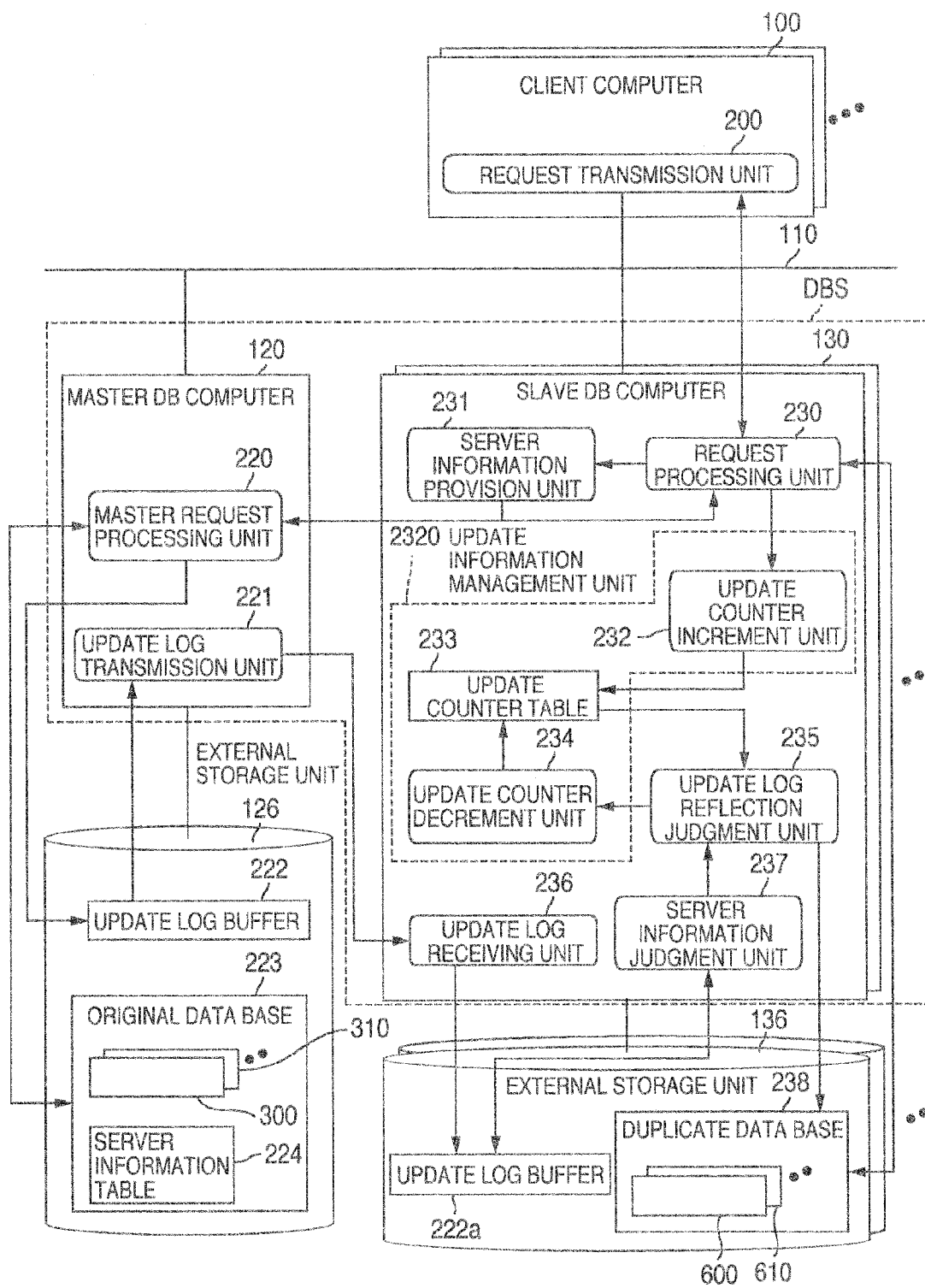
FIG. 2 is a diagram showing the module configuration according to the first embodiment of the invention.

The data structure shown in the module diagram of FIG. 2 is explained below with reference to the drawing showing a specific example.

Figure 3:
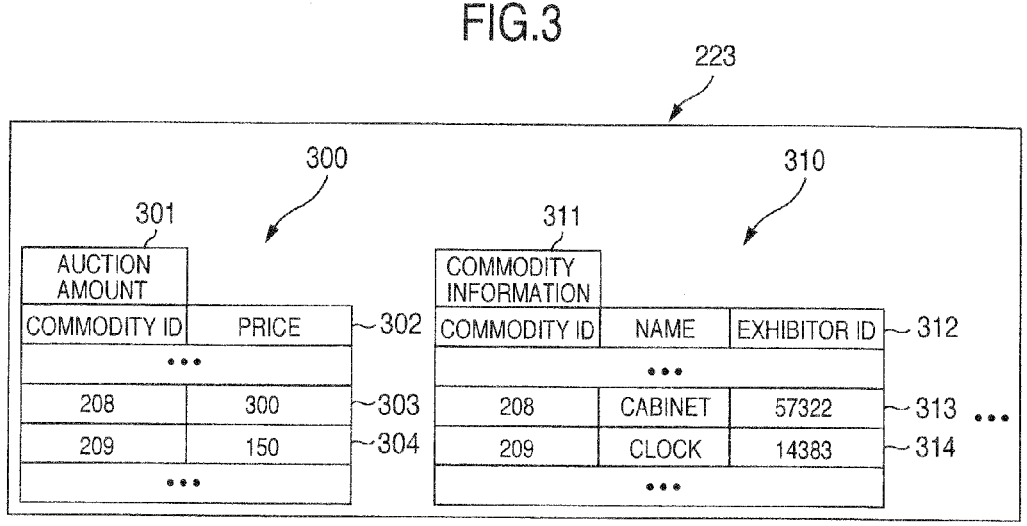
FIG. 3 shows a part of examples of the original data base according to the first embodiment of the invention.
Figure 4:
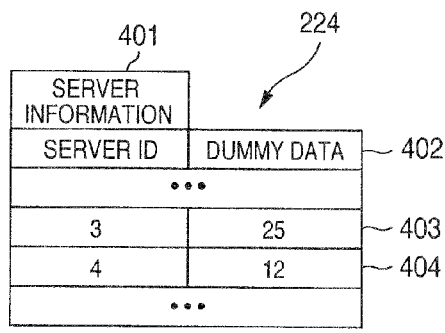
FIG. 4 shows a part of examples of the server information table according to the first embodiment of the invention.

The original data base 223 has stored therein a table for storing the data used, by the applications as shown in FIG. 3 and a server information table as shown in FIG. 4.

FIG. 3 shows a part of examples of the tables stored in the original data base 223. Tables 300 and 310 are stored in the original data base 223. The tables 300, 310 are assigned the table names 301, 311, respectively, and with the header information 302, 312, has stored therein row data 303, 304, 313, 314 in the number of zero or more. The row data are an arrangement of data in the form designated by the header information. In the case of FIG. 3, the auction amount table 300, as shown in the header information 302, has stored therein the row data with the "commodity ID" and the "price" arranged in that order. In the row data 303, therefore, "208" is the data indicating the commodity ID and "300" the data indicating the price.

FIG. 4 shows an example of the server information table 224 (401). As shown in the header information 402, the server information table 224 stores the "server ID" and the "dummy data". The server ID is an identifier uniquely assigned to each slave DB computer 130. The dummy data is used to generate the update process and the numeral thereof has no special meaning.

Figure 5:
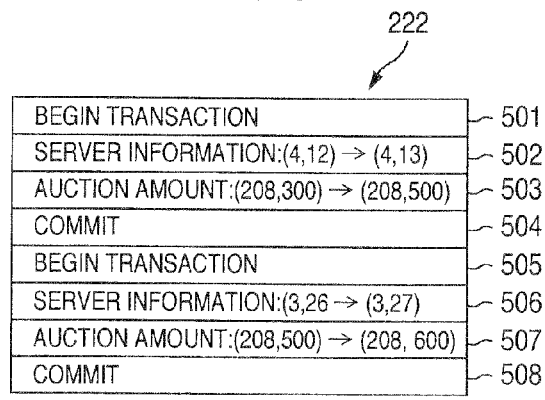
FIG. 5 shows a part of examples of the update log buffer according to the first embodiment of the invention.

FIG. 5 shows an example of the state in which the update log is stored in the update log buffer 222. The update log includes the transaction start logs designated by numerals 501, 505, the commit logs designated by numerals 504, 508, and the data update logs designated by numerals 502, 503, 506, 507. The transaction start log and the commit log are the update logs indicating the start and the end, respectively, of the transaction. Incidentally, only one of the transaction start log and the commit log may be used. The data update log has stored, therein the name of the table updated, and the row data before and after update. As indicated by numerals 501 to 504 and 505 to 508, a series of update logs generated by one transaction are referred, to as an update transaction log.

FIG. 6 shows a part of examples of the data stored in the duplicate data base 238. The duplicate data base 238 has stored therein tables 600, 610 as a duplicate of the tables 300, 310 (FIG. 3), respectively, stored in the original data base 223. The duplicate of the server information table 224, however, is not stored. Also, a unique counter ID in the duplicate data base 238 of the slave DB computer 130 is added to each row data of the tables 600, 610. Incidentally, the counter ID is the information handled only in the slave DB computer 130.

FIG. 7 shows an example of the update counter table 233. The update counter table 233 has stored therein the data on sets of the counter ID and the update counter.

Figure 8:
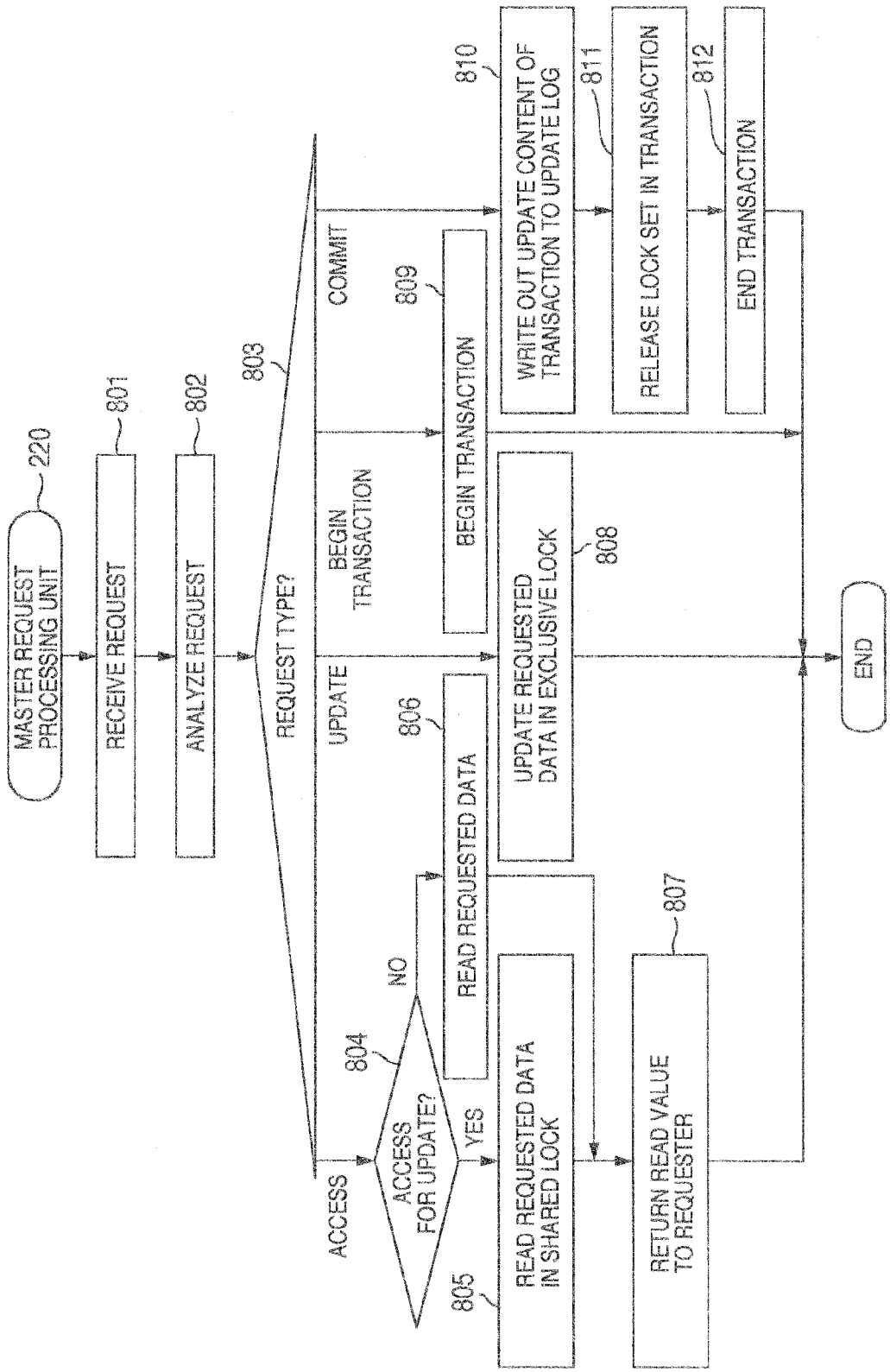
FIG. 8 is a flowchart showing the operation of the master request processing unit according to the first embodiment of the invention.

The operation of each module shown in the module diagram of FIG. 2 is explained below. FIG. 8 is a flowchart showing the operation of the master request processing unit 220.

The master request, processing unit 220 first receives the request from, the request processing unit 230 of the slave DB computer 130 (step 801), and by analyzing the particular request (step 802), judges the type of the request (step 803).

In the case of the access request ("access" in step 803), the master request processing unit 220 further judges whether the access is for update or not (normal access) (step 804). The access for update is the one in which the access result is used with the update request, in the same transaction and can be expressly designated by the data base user. In the case of the access for update (YES In step 804), the requested data is retrieved, from the original data base 223 and subjected to the shared lock to read the value (step 805). In the case of the normal access (NO in step 804), the requested data is retrieved from the original data base 223 and the value thereof read (step 806). After both steps 805 and 806, the data that has been read is returned, to the requester (the request processing unit 230 of the slave DB computer 130) (step 807).

In the case of the update request ("update" in step 803), the requested data is retrieved from the original data base 223 and, by subjecting it to the exclusive lock, the value thereof is changed (updated) (step 808).

In the case of the transaction start request ("transaction start" in step 803), the transaction is started (step 309).

In the case of the commit request ("commit" in step 803), the content updated by the transaction including the transaction start and commit is added to the update log buffer 222 (written out to the updated log) (step 810), and by canceling the shared lock and the exclusive lock effected in the transaction (step 811), the transaction is ended (step 812).

Figure 9:
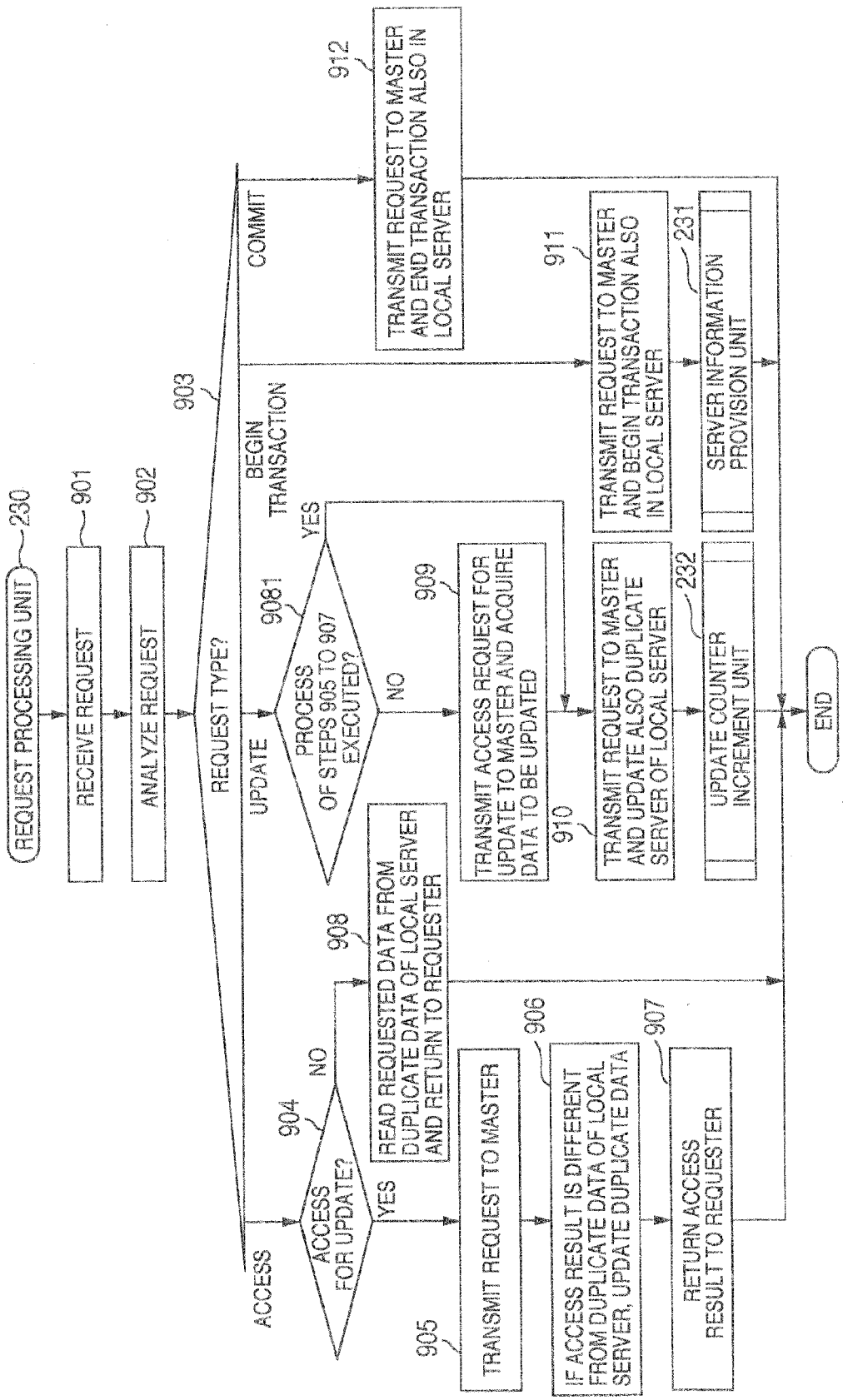
FIG. 9 is a flowchart showing the operation of the request processing unit according to the first embodiment of the invention.

FIG. 9 is a flowchart showing the operation of the request processing unit 230. The request processing unit 230 first receives the request from the request transmission unit 200 of the client computer 100 (step 901), analyzes the particular request (step 902) and judges the type of the request (step 903).

In the case of the access request ("access" in step 903), the request processing unit 230 further judges whether the access is for update or not (normal access) (step 904). In the case of the access for update (YES in step 904), the same request is transmitted to the master DB computer 120 (step 905), the access result is received, and the data corresponding to the particular result is retrieved from the duplicate data base 238 of the slave DB computer 130 thereof (local server). The particular data, if different In value from the access result, is changed (updated) to the access result (step 906) and the access result is returned to the requester (the request transmission unit 200 of the client computer 100) (step 907). In the case of the normal access (NO in step 904), the requested data Is retrieved from the duplicate data base 238 of the slave DB computer 130 thereof (local server), and the value thereof is returned to the requester (the request transmission unit 200 of the client computer 100) (step 908).

In the case of the update request ("update" in step 903), it is judged whether the process of steps 905 to 907 has been executed immediately before or not (step 9081), and in the case where the answer is NO, the process proceeds to step 909, while in the case where the answer is YES, on the other hand, the process proceeds to step 910. Based on this request, the access request for update is generated in step 909 to access the data to be updated, and this access request is transmitted to the master DB computer 120 to acquire the data to be updated. In step 910, this update request is transmitted to the master DB computer 120, and the data of the duplicate data base 238 of the slave DB computer 130 thereof (local server) is updated. After that, the process is executed in the update counter increment unit 232.

In the case of the transaction start request ("transaction start" in step 903), the same request (transaction start request) Is sent to the master DB computer 120, and the transaction is started also in the slave DB computer 130 thereof (local server) (step 911) thereby to execute the process of the server information provision unit 231.

In the case of the commit request ("commit" in step 903), the same request (commit request) Is sent to the master DB computer 120, and the transaction is ended also in the slave DB computer 130 thereof (local server) (step 912).

Figure 10:
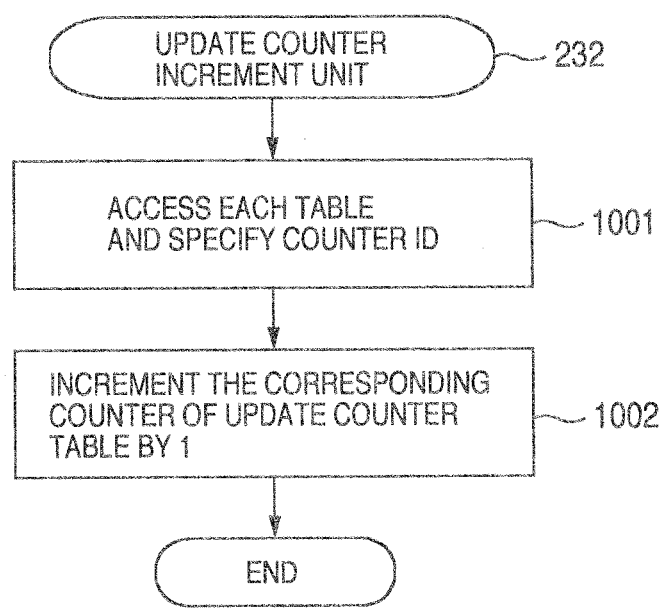
FIG. 10 is a flowchart showing the operation of the update counter increment unit according to the first embodiment of the invention.

FIG. 10 is a flowchart showing the operation of the update counter increment unit 232 (after the process of step 910 in FIG. 9).

The update counter Increment unit 232 is accessed by the request processing unit 230 when processing the update request, and by accessing each table (the auction amount table 600, the commodity information table 610), specifies the counter ID (step 1001). Then, the update counter corresponding to the counter ID of the row data including the data to be updated in the update information table 233 is incremented by "1" (step 1002).

Figure 11:
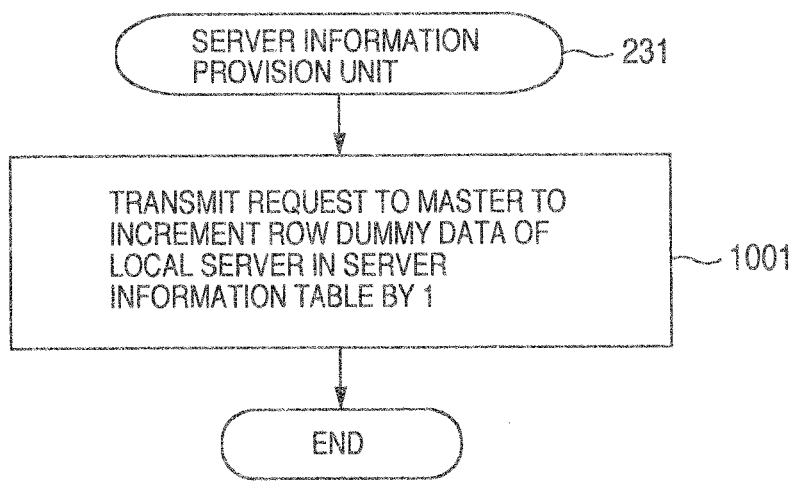
FIG. 11 is a flowchart, showing the operation of the server information provision unit according to the first embodiment of the invention.

FIG. 11 is a flowchart showing the operation of the server information provision unit 231 (after the process of step 911 in FIG. 9).

The server information provision unit 231 is accessed by the request processing unit 230 when processing the transaction start request, and transmits, to the master DB computer 120, the update request to increment by "1" the dummy data of the row data including the server ID of the local slave DB computer 130 (local server) in the server information table 224 (step 1101). As a result, at the subsequent time when the transaction ends with the commit request, the data update log for updating the row data including the server ID of the local slave DB computer 130 (local server) is added to the update log buffer 222a. Incidentally, the update request for the dummy data is issued to obtain the server id of the local slave DB computer 130 (local server), and may be any update request without increment by "1".

Figure 12:
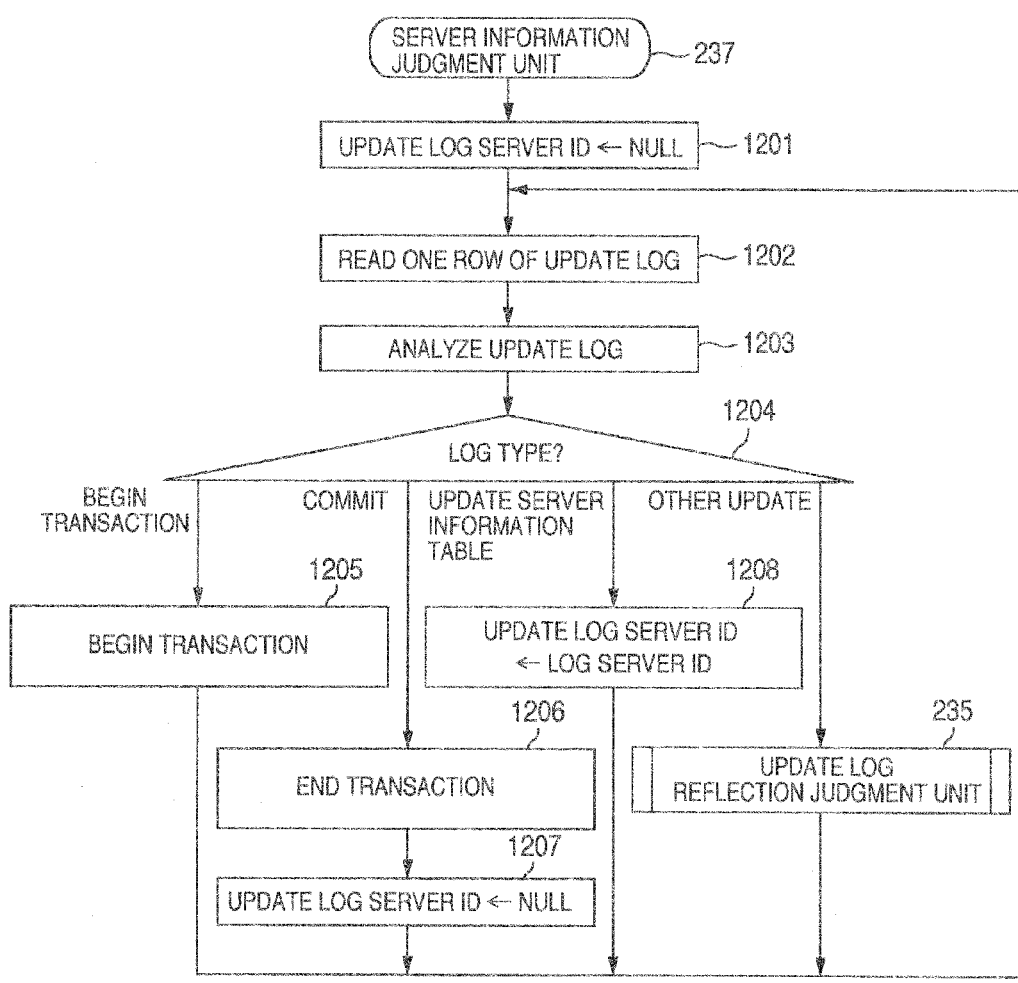
FIG. 12 is a flowchart showing the operation of the server information judgment unit according to the first embodiment of the invention.

FIG. 12 is a flowchart showing the operation of the server information judgment unit 237.

The server information judgment unit 237 first prepares a variable as an update log server ID, and initializes the value thereof to "null" (step 1201). Next, one row of the update log is retrieved (read) from the update log buffer 222a (step 1202), and the particular one row is analyzed (step 1203) to judge the log type (step 1204).

In the case of the transaction start log ("transaction start" in step 1204), the transaction is started (step 1205). In the case of the commit log ("commit" in step 1204), the transaction is ended (step 1206), and "null" is set in the update log server ID (step 1207). In the case of the data update log for updating the row data of the server information table ("update sever information table" in step 1204), the server ID is read from, the particular data update log (for example, the server ID "4" is read from the data update log 502 shown in FIG. 5), and the particular value is set in the update log server ID (step 1208). In the case of other data update log ("other update" in step 1204), the process of the update log reflection judgment unit 235 is executed.

Figure 13:
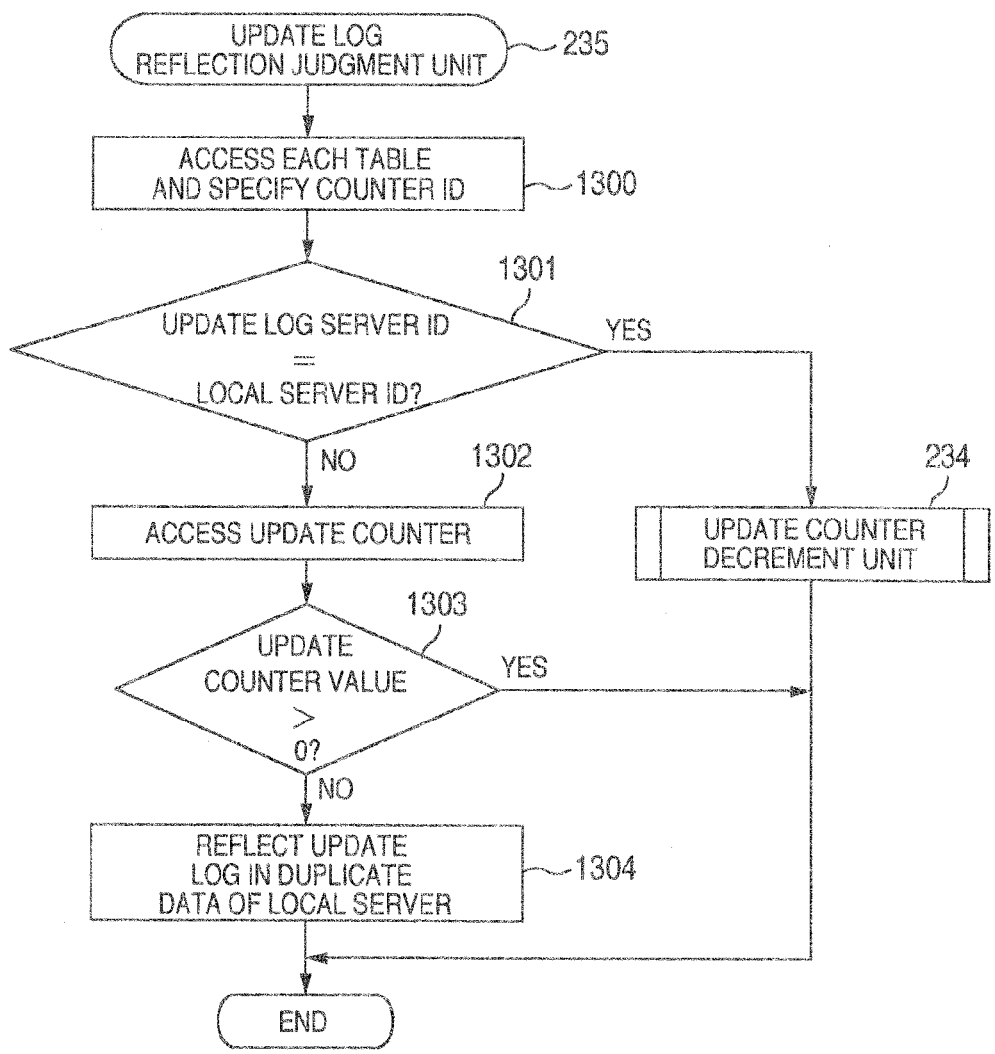
FIG. 13 is a flowchart showing the operation of the update log reflection judgment unit according to the first embodiment of the invention.

FIG. 13 is a flowchart showing the operation of the update log reflection judgment unit 235, The update log reflection judgment unit 235 specifies the counter ID by reference to each table (the auction amount table 600, the commodity information table 610) (step 1300). Next, in order to determine whether the update content of the update log is reflected or not, the value of the update log server ID is checked to see whether it coincides with the server ID of the local slave DB computer 130 (local server) (step 1301). In the case of coincidence (YES in step 1301), the update counter decrement unit 234 executes the process.

In the case of incoincidence (NO in step 1301), on the other hand, the update counter corresponding to the counter ID of the row data to be updated is read from (by accessing) the update counter table 233 (step 1302), and whether the particular value is larger than "0" or not is checked (step 1303).

In the case where the value is larger than "0" (YES in step 1303), the process is ended without reflecting the update. In the case where the value is "0" (NO in step 1303), on the other hand, the update is reflected in the duplicate data base 238 of the local slave DB computer 130 (local server) (step 1304).

Figure 14:
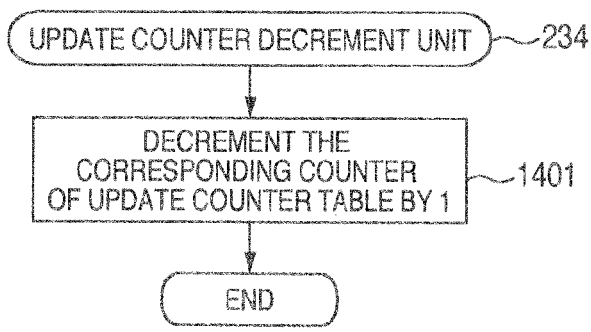
FIG. 14 is a flowchart showing the operation of the update counter decrement unit according to the first embodiment of the invention.

FIG. 14 is a flowchart showing the operation of the update counter decrement unit 234.

The update counter decrement unit 234 is accessed by the update log reflection judgment unit 235 and decrements by "1" the update counter corresponding to the counter ID of the data to be updated (step 1401).

Figure 15:
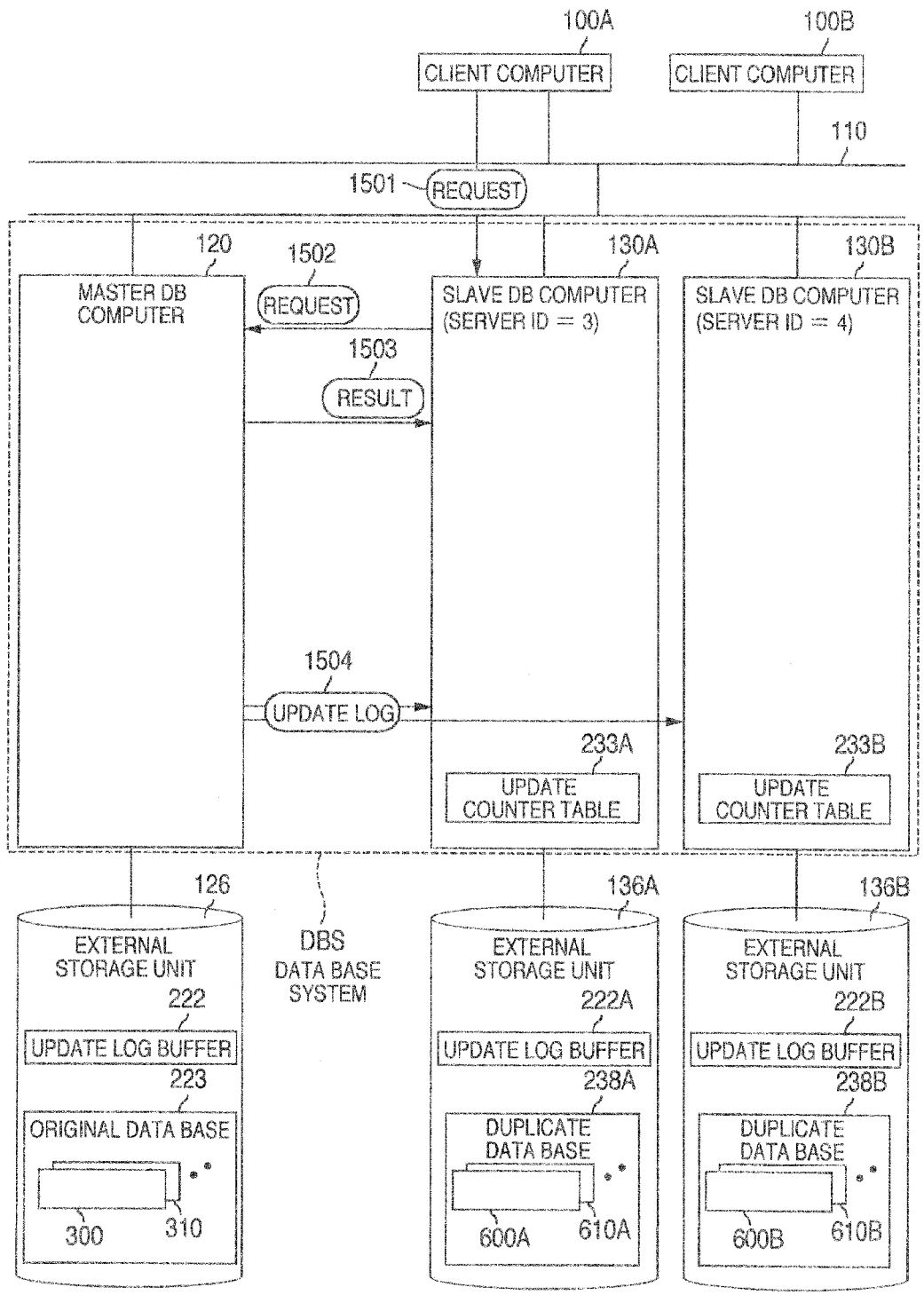
FIG. 15 shows an example of the data flow at the time when an update request is generated according to the first embodiment of the invention.

An explanation is given below about a specific example of the process flow from the acceptance of the update request by slave DB computer 130 from the client computer 100 to the reflection of the update in other slave DB computers 130. In this case, as shown in FIG. 15, consider a data base system DBS configured of the master DB computer 120, the two slave DB computers 130A (130) and 130B (130). Incidentally, the same component elements as those in FIG. 2 are designated by the same reference numerals with or without the affix "A" or "B".

FIG. 15 shows the data flow between the servers from the transmission of the update request from the client computer 100A (100) to the slave DB computer 130A to the reflection of the update with the request. Upon transmission of the request 1501 from the client computer 100A to the slave DB computer 130A, the request 1502 is transmitted from the slave DB computer 130A to the master DB computer 120 correspondingly. In the case where the request 1502 is the access request, the result 1503 is returned from the master DB computer 120 to the slave DB computer 130A. After that, the update log 1504 generated by the update request is transmitted from the master DB computer 120 to the slave DB computers 130A, 130B.

Figure 16:
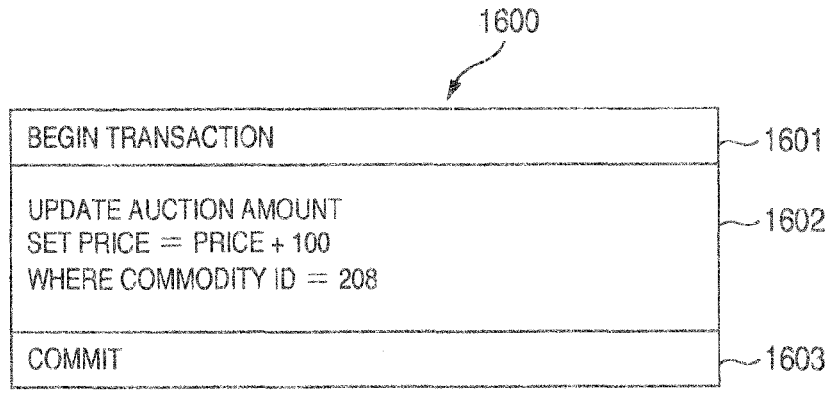
FIG. 16 shows an example of the transaction transmitted to the slave DB computer from the client computer according to the first embodiment of the invention.

Consider a case in which the transaction 1600 (corresponding to the request 1501) as shown in FIG. 16 is transmitted from the client computer 100A to the slave DB computer 130A.

Figure 17:
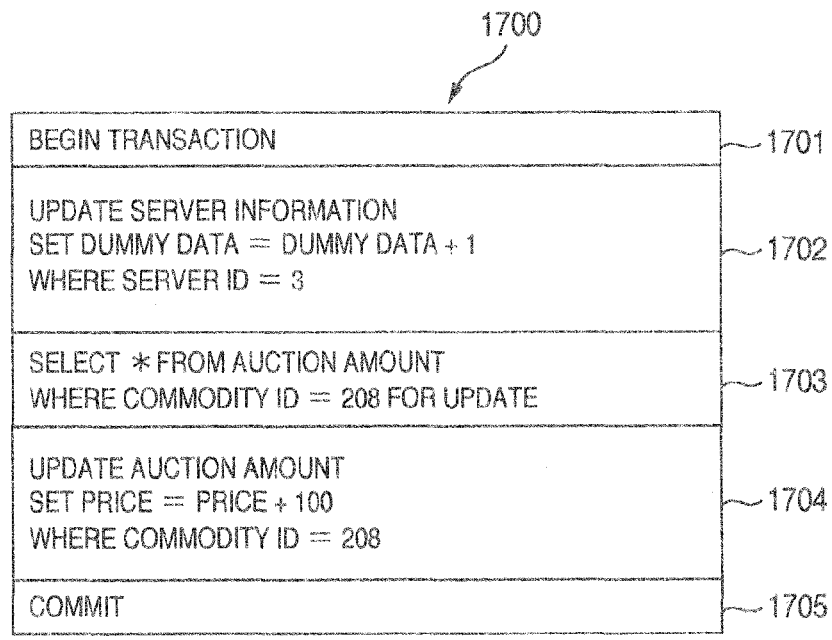
FIG. 17 shows an example of the transaction transmitted to the master DB computer from the slave DB computer according to the first embodiment of the invention.
Figure 18:
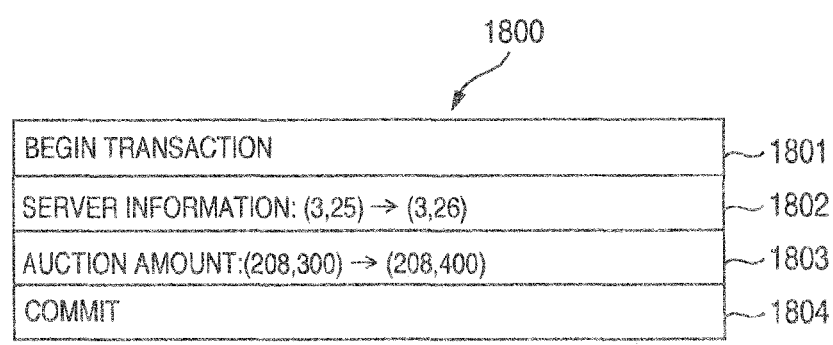
FIG. 18 shows an example of the update transaction log transmitted to the slave DB computer from the master DB computer according to the first embodiment of the invention.

In the process, the transaction 1700 (corresponding to the request 1502) is transmitted from the slave DB computer 130A to the master DB computer 120 as shown in FIG. 17. Also, the update, transaction log 1800 (corresponding to the update log 1504) is transmitted from the master DB computer 120 to the slave DB computers 130A, 130B as shown in FIG. 18.

Figure 19:
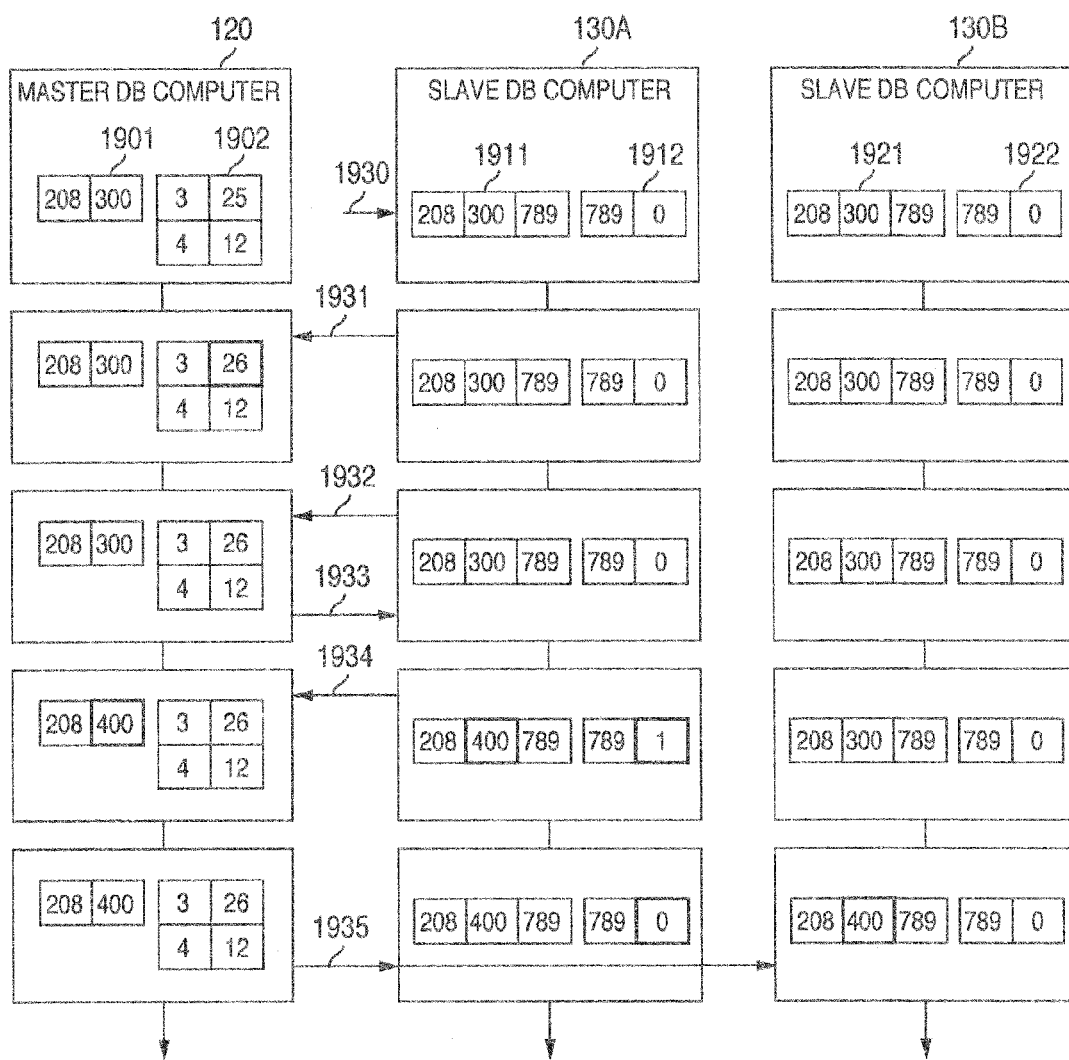
FIG. 19 shows the data change of each DB computer in the case where an update request is generated according to the first embodiment of the invention.

The change in the value of the data held by each DB computer in the process is explained with reference to FIG. 19 (the data change point is indicated by thick frame). In FIG. 19, numeral 1901 designates a part of the original data base 223, numeral 1902 a part of the server information table 224, numeral 1911 a part of the duplicate data base 238 of the slave DB computer 130A, numeral 1912 a part of the update counter table 233 of the slave DB computer 130A, numeral 1921 a part of the duplicate data base 238 of the slave DB computer 130B, and numeral 1922 a part of the update counter table 233 of the slave DB computer 130B (reference numeral not attached to other than the top stage).

In the case where the transaction 1600 is transmitted from the client computer 100A to the slave DB computer 130A (step 1930), the slave DB computer 130A first transmits the transaction start request 1701 and the update request 1702 for updating the dummy data corresponding to the local server ID (=3) of the server information table 224 to the master DB computer 120. As a result, the corresponding data in the server information table 1902 is updated ("25" to "26") (step 1931).

Next, the slave DB computer 130A generates, from the update request 1602, the access request 1703 for update to access the data to be updated, and transmits it to the master DB computer 120 (step 1932). As a result, the corresponding row data of the original data base 1901 is subjected to shared lock, and the corresponding row data "208, 300" is returned from the master DB computer 120 to the slave DB computer 130A. This is, however, equal to the data of the duplicate data base 1911 and therefore ignored (step 1933).

Next, the slave DB computer 130A transmits the same update request 1704 as the update request 1602 to the master DB computer 120, and further, the local server processes the update, so that the corresponding counter of the update counter table 1912 is incremented by "1". As a result, the corresponding data in the original data base 1901, the duplicate data base 1911 and the update counter table 1912 are updated ("300" to "400", "0" to "1") (step 1934). In the process, the slave DB computer 130A sends not the same update request 1704 as the update request 1602 but generates an update request to overwrite the update result processed with the update request by the local server, on the row data acquired by the access request 1703 for updating, and may be sent to the master DB computer 120. By doing so, the update result is not required to be calculated by the master DB computer 120, and the load on the master DB computer 120 is reduced.

Next, the slave DB computer 130A sends the commit request 1705 to the master DB computer 120. As a result, the transaction is ended, and the update transaction log 1800 is added to the update log buffer 222 of the master DB computer 120. After that, the update transaction log 1800 is transmitted from the master DB computer 120 to the slave DB computers 130A, 130B.

Assume that the slave DB computer 130A accepts the update transaction log 1800. In view of the fact that the server ID stored in the update log 1802 is coincident with the server ID (=3) of the local server, the update counter corresponding to the data to be updated in the update log 1803 is decremented by "1" ("1" to "0"). Assume, on the other hand, that the slave DB computer 130B accepts the update transaction log 1800. In view of the fact that the server ID stored in the update log 1802 is different from the server ID (=4) of the local server and the value on the update counter corresponding to the data to be updated in the update log 1803 is "0", the update log 1803 is reflected in the duplicate data base 1921 of the local server ("300" to "400") (step 1935). In this way, the update due to the update request transmitted to the slave DB computer 130A is reflected correctly in the slave DB computer 130B.

Next, in the data base system DBS according to the first embodiment, an explanation is given about the fact that even in the case where the update log arrives late due to the conflict of the update requests, the latest data is prevented from returning to the old data due to the update reflection of the old update log.

Figure 20:
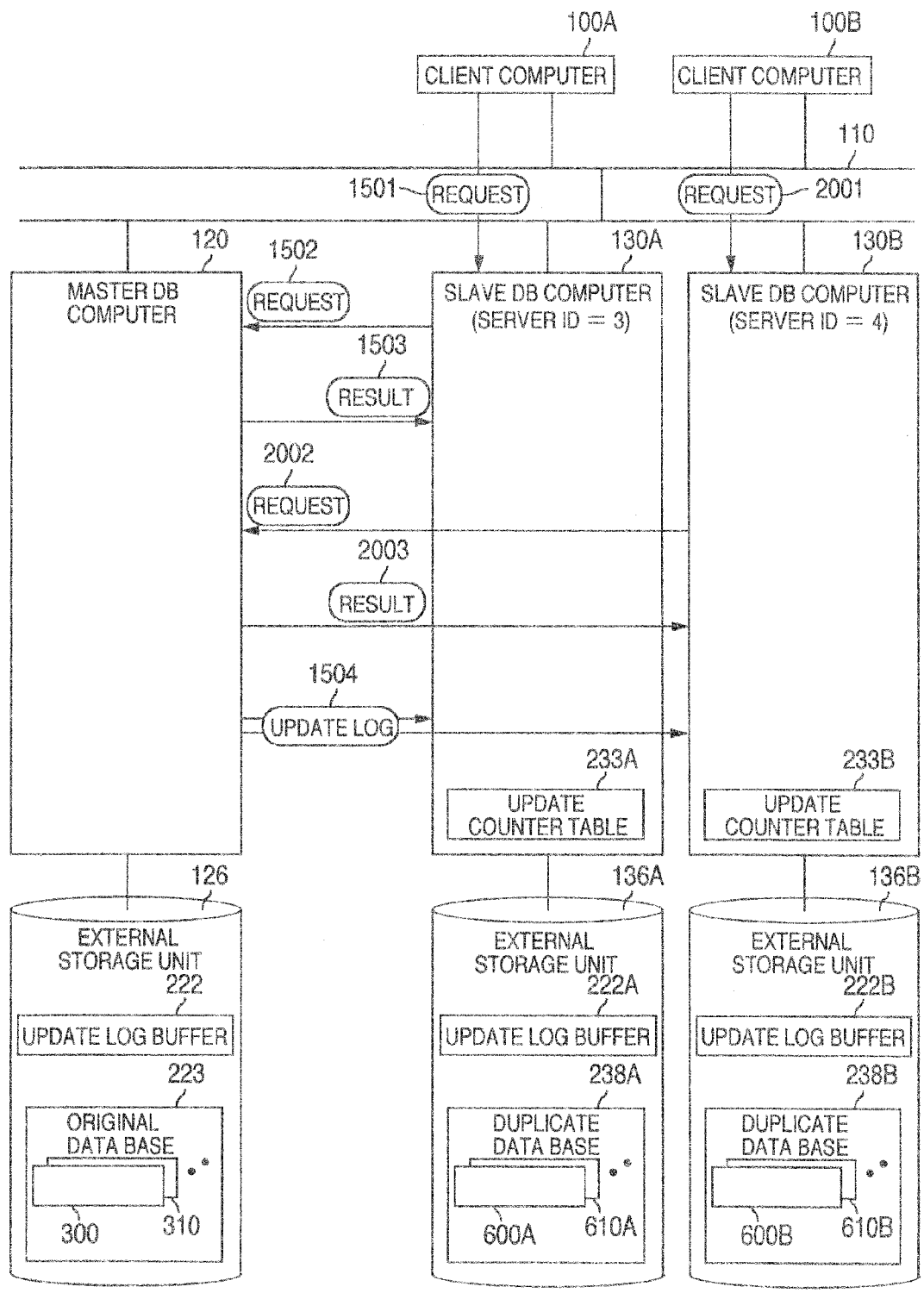
FIG. 20 shows an example of the data flow at the time when an update request conflict occurs according to the first embodiment of the invention.

FIG. 20, like FIG. 15, is a diagram showing the data flow between the servers in the case where the update request for the same data is transmitted from the client computer 100B to the slave DB computer 130B immediately after the update request is transmitted from the client computer 100A to the slave DB computer 130A in the data base system DBS.

Upon transmission of the request 1501 from the client computer 100A to the slave DB computer 130A, the request 1502 is transmitted correspondingly from the slave DB computer 130A to the master DB computer 120. In the case where the request 1502 is the access request, the result 1503 is returned from the master DB computer 120 to the slave DB computer 130A. In similar fashion, upon transmission of the request 2001 from, the client computer 100B to the slave DB computer 130B, the request 2002 is transmitted correspondingly from, the slave DB computer 130B to the master DB computer 120. In the case where the request 2002 is the access request, the result 2003 is returned from the master DB computer 120 to the slave DB computer 130B. After that, the update log 1504 generated by the update request is transmitted from the master DB computer 120 to the slave DB computers 130A, 130B.

Figure 21:
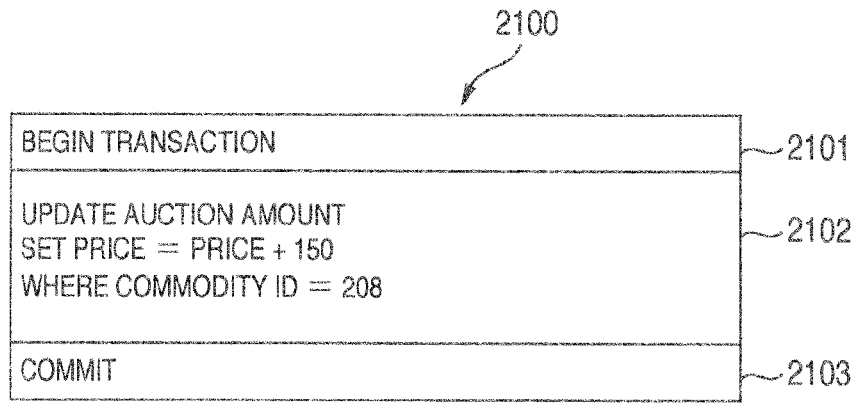
FIG. 21 shows an example of the transaction transmitted to the slave DB computer from the client computer according to the first embodiment of the invention.

Consider a case in which the transaction 2100 (corresponding to the request 2001) shown in FIG. 21 is transmitted from the client computer 100B to the slave DB computer 130B immediately after transmission of the transaction 1600 (corresponding to the request 1501) from the client computer 100A to the slave DB computer 130A.

Figure 22:
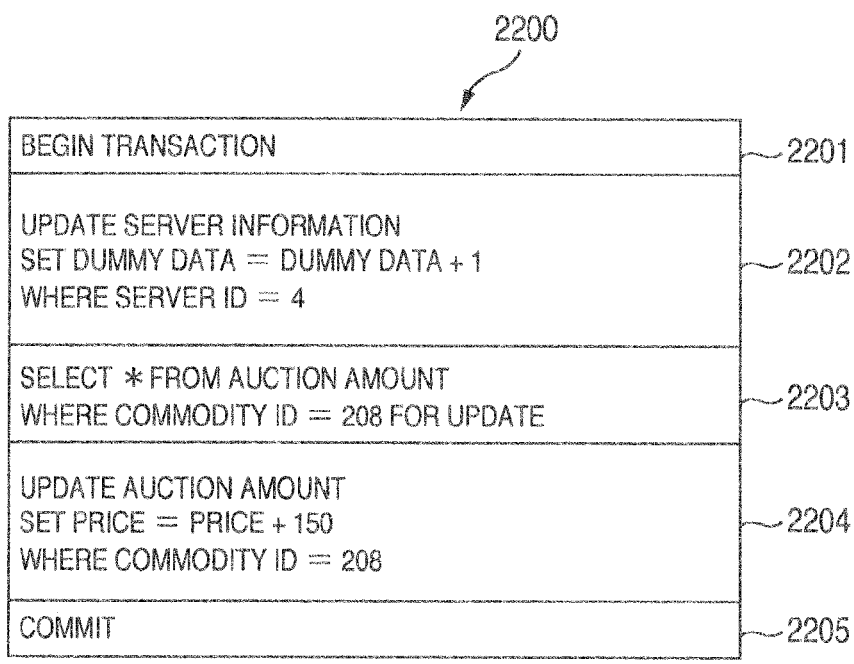
FIG. 22 shows an example of the transaction transmitted to the master DB computer from the slave DB computer according to the first embodiment of the invention.
Figure 23:
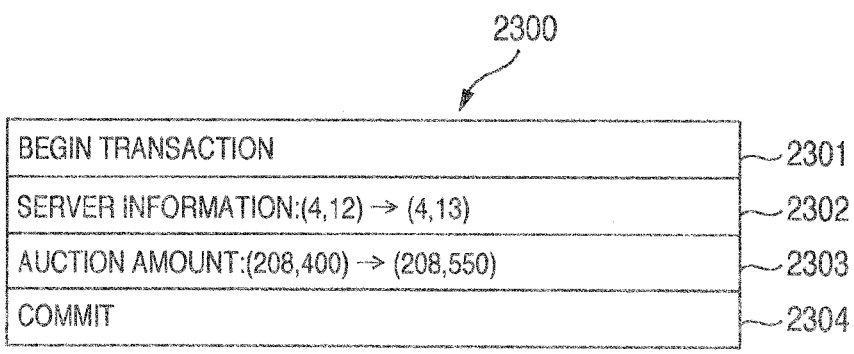
FIG. 23 shows an example of the update transaction log transmitted to the slave DB computer from the master DB computer according to the first embodiment of the invention.

In the process, the transaction transmitted from the slave DB computer 130A to the master DB computer 120 takes the form like the transaction 1700 (corresponding to the request 1502) shown in FIG. 17, while the transaction transmitted from the slave DB computer 130B to the master DB compute 120 assumes the form of the transaction 2200 (corresponding to the request 2002) shown in FIG. 22. Also, the update transaction log transmitted from the master DB computer 120 to the slave DB computers 130A, 130B assumes the forms of the update transaction log 1800 (corresponding to the update log 1504) shown in FIG. 18 and the update transaction log 2300 (corresponding to the update log 1504) shown in FIG. 23, respectively.

Figure 24:
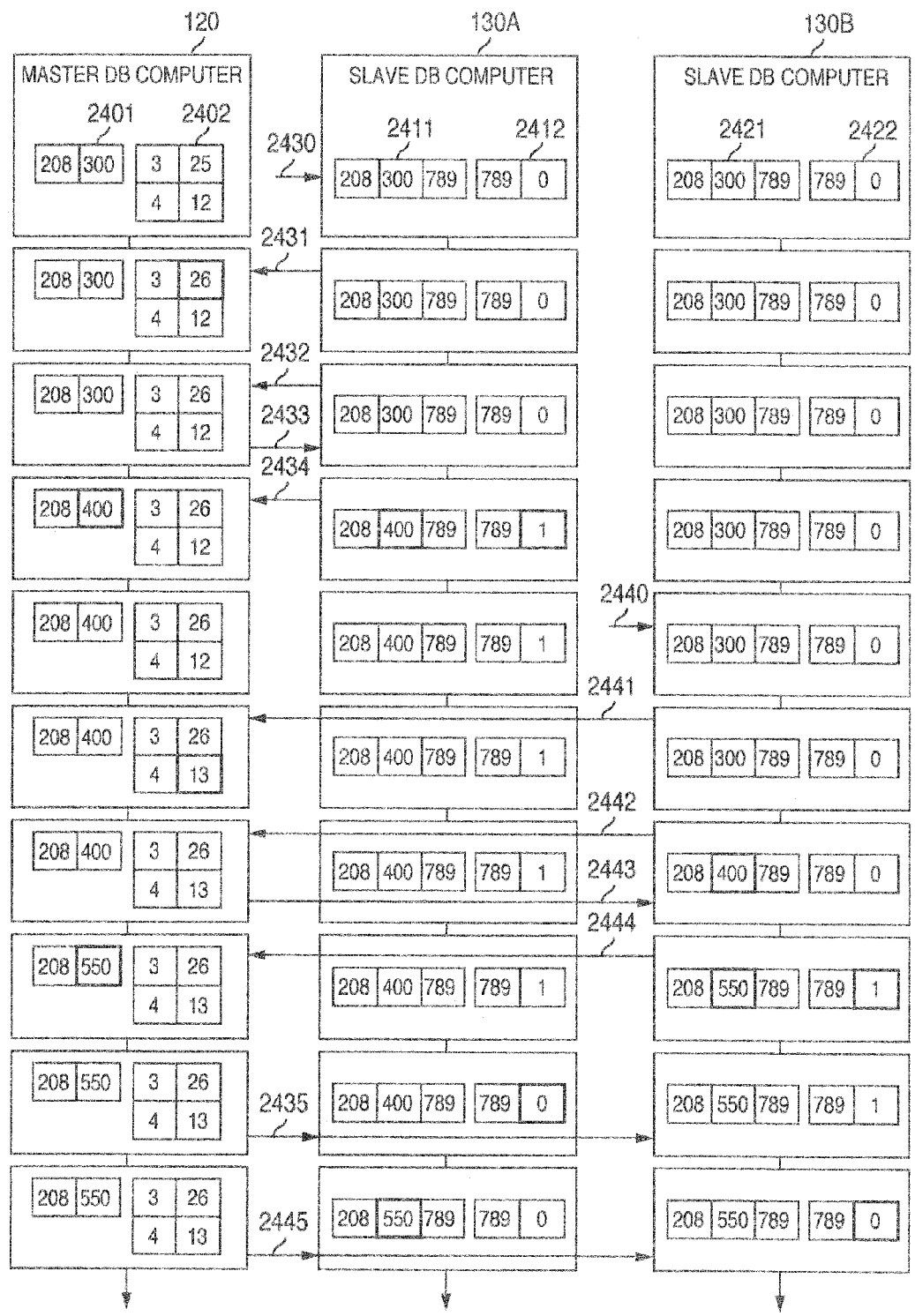
FIG. 24 shows the data change in each DB computer in the case where an update request conflict occurs according to the first embodiment of the invention.
Figure 25:
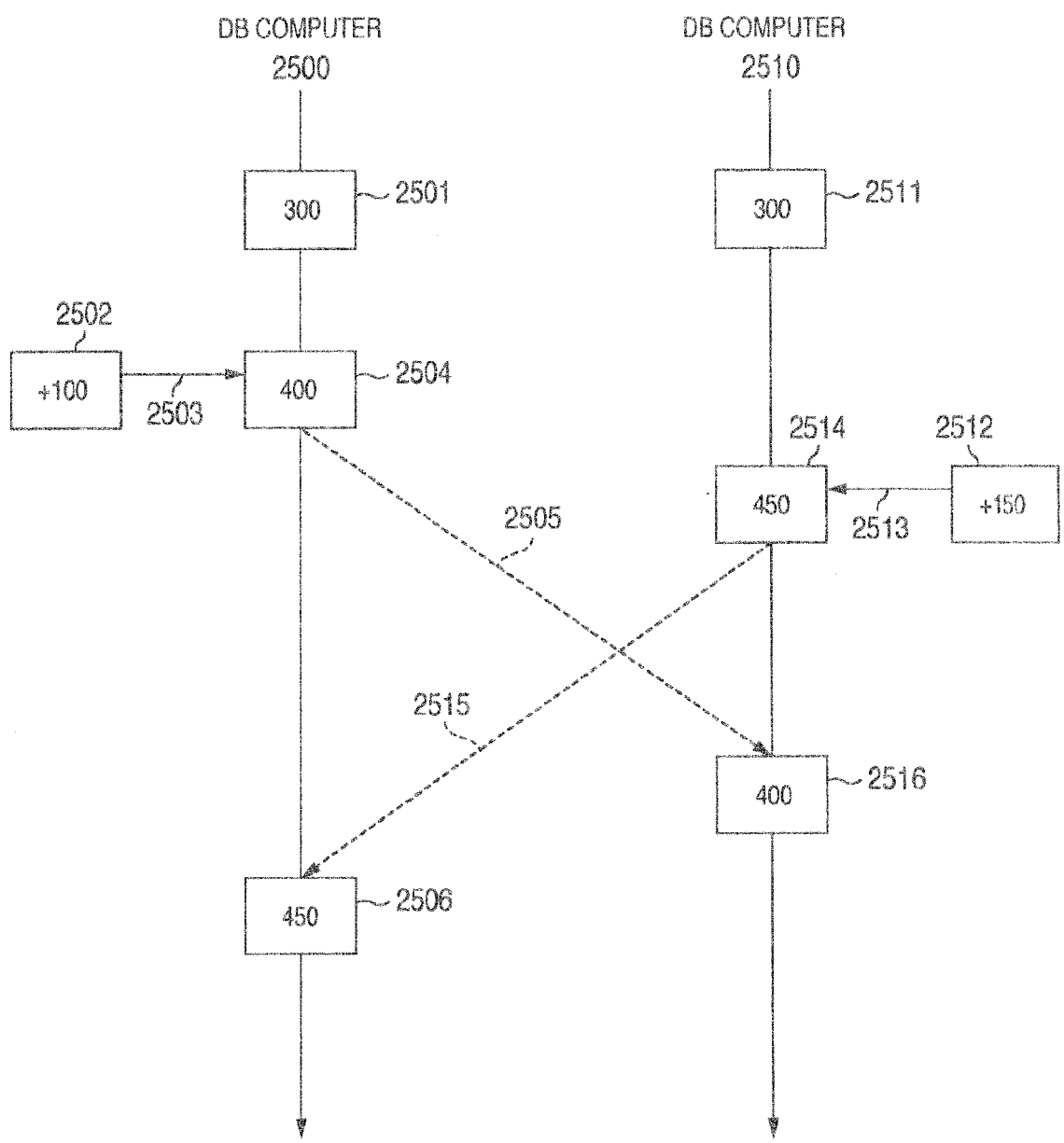
FIG. 25 shows an example of the data change in the case where update requests are generated successively in the two DB computers and the update logs are transmitted by the two DB computers to each other.

The change in the value of the data held in each DB computer in the process is explained with reference to FIG. 24 (the data change point is indicated by thick frame). In FIG. 24, numeral 2401 designates a part, of an original data base 223, numeral 2402 a part of a server information table 224, numeral 2411 a part of a duplicate data base 238 of the slave DB computer 130A, numeral 2412 a part of an update counter table 233 of the slave DB computer 130A, numeral 2421 a part of a duplicate data base 238 of the slave DB computer 130B, and numeral 2422 a part of an update counter table 233 of the slave DB computer 130B (no reference numeral shown in other than the top stage).

During the period from the transmission of the transaction 1600 from the client computer 100A to the slave DB computer 130A (step 2430) to the transmission of the commit request 1705 to the master DB computer 120 (step 2434), the process is the same as steps 1930 to 1934 in FIG. 19 described above, and therefore, not explained again.

Next, upon transmission of the transaction 2100 from the client computer 100B to the slave DB computer 130B (step 2440), the slave DB computer 130B first transmits the transaction start request 2201 and the update request 2202 for updating the dummy data corresponding to the local server ID (=4) of the server information table 224 to the master DB computer 120, with, the result that the corresponding data in the server information table 2402 is updated ("12" to "13") (step 2441).

Next, the slave DB computer 130B generates, from the update request 2102, the access request 2203 for update to access the data to be updated, and transmits it to the master DB computer 120 (step 2442). As a result, the corresponding row data of the original data base 2401 is subjected to the shared lock, and the corresponding row data ("208", "400") are returned from the master DB computer 120 to the slave DB computer 130B. Since this is different from the data of the duplicate data base 2421, however, the corresponding data of the duplicate data base 2421 is updated ("300 to "400") (step 2443).

Next, the slave DB computer 130B transmits the same update request 2204 as the update request 2102 to the master DB computer 120, and further, by processing the update also in the local server, increments the counter of the update counter table 2422 by "1" ("0" to "1"). As a result, the corresponding data in the original data base 2401, the duplicate data base 2421 and the update counter table 2422 are updated ("400" to "550", "0" to "1") (step 2444). Next, the slave DB computer 130B sends the commit request 2205 to the master DB computer 120, with the result that the transaction ends and the update transaction log 2300 is added to the update log buffer 222 of the master DB computer 120.

After that, the update transaction log 1800 is transmitted from the master DB computer 120 to the slave DB computers 130A, 130B (step 2435). The server ID (=3) stored in the update log 1802 is coincident with the server ID (=3) of the local server. In the slave DB computer 130A, therefore, upon acceptance of the update transaction log 1800, the update counter corresponding to the data to be updated in the update log 1803 is decremented, by "1" ("1" to "0"). On the other hand, the server ID (=3) stored in the update log 1802 is different from, the server ID (=4) of the local server and the value on the update counter corresponding to the data to be updated in the update log 1803 is "1". The slave DB computer 130B, therefore, upon acceptance of the update transaction log 1800, discards it without reflecting the update log 1803.

Next, the update transaction log 2300 is transmitted from the master DB computer 120 to the slave D computers 130A, 130B (step 2445). The server ID (=4) stored in the update log 2302 is different from the server ID (=3) of the local server and the value on the update counter corresponding to the data to be updated in the update log 2303 is "0". The slave DB computer 130A, therefore, upon acceptance of the update transaction log 2300, reflects the update log 2303 in the duplicate data base 2411 ("400" to "550"). The server ID (=4) stored in the update log 2302 is coincident with the server ID (=4) of the local server. The slave DB computer 130B, therefore, upon acceptance of the update transaction log 2300, decrements by "1" the update counter corresponding to the data to be updated in the update log 2303 ("1" to "0").

As described above, in the data base system DBS according to the first embodiment, even in the case where a conflict occurs between update requests, the correct update reflection is completed without losing the update (data) or overwriting the old value on the latest value by the reflection, of the old update log as shown in FIG. 26, Specifically, in the data base system of master-slave configuration to reflect the update in the slave with the update log transmitted from the master, the update result can be accessed with the immediately following access request. As a result, a data base system with the load balanced among a plurality of DB computers can be configured for an application such as the on-line auction in which the update result is required to be accessed Immediately while avoiding the generation of the lost update.

In the case where the data update program (the program to realize the data update method) to be executed by the computers making up the master DB computer 120 and the slave DB computer 130 is generated and installed in each computer, then the computers can realize each function based on the particular data update program.

Second Embodiment

A second embodiment of the invention is explained below. The difference from the first embodiment is mainly explained and the points shared by the first embodiment are not explained or briefly explained.

According to the first embodiment, the update counter is held with the data, structure called the update counter table 233. According to the second embodiment, in contrast, the update counter is stored directly in the duplicate data base 238.

Figure 1:
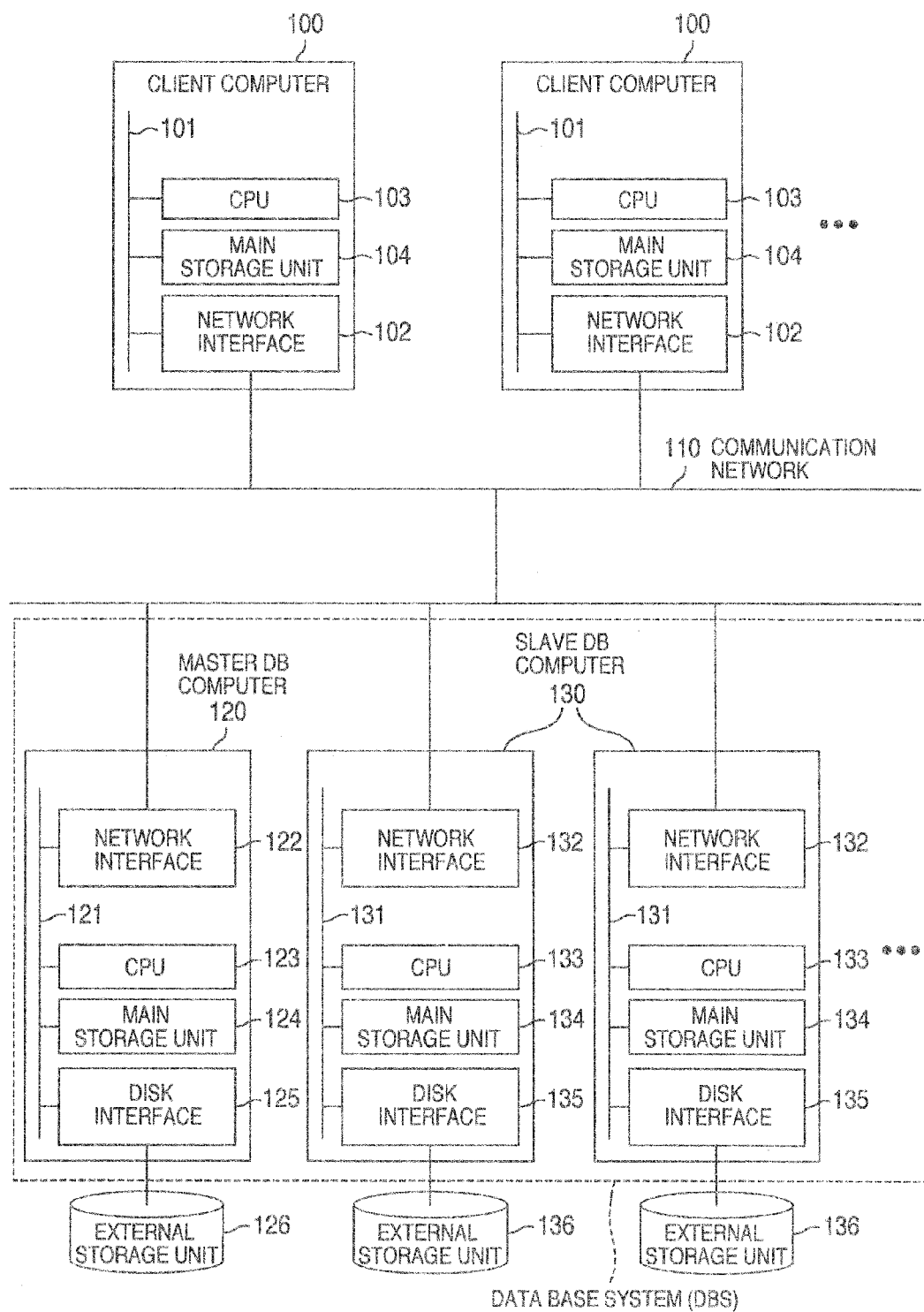
FIG. 1 is a diagram showing the hardware configuration according to a first embodiment of the invention.

The second, embodiment has the same hardware configuration as the first embodiment (FIG. 1).

The module configuration of the second embodiment is identical with that of the first-embodiment (FIG. 2), except that in the second embodiment, the update counter table 233 is lacking and all the update and access for the update counter are replaced with the update and access for the duplicate data base 238 in the external storage unit 136. The module configuration of the second embodiment, therefore, is not specifically shown.

FIG. 27 shows a part of examples of the duplicate data base 238 according to the second embodiment. As shown in FIG. 27, the row data in the tables 2700, 2710 hold the update counter, and the counter ID (FIGS. 6, 7) is not required.

The operation of each module in the second embodiment is identical with that of the first embodiment except that in the second embodiment, the update of and the access to the update counter table 233 make up the update of and the access to the duplicate data base 238 (in the flowcharts of FIGS. 10 and 13, the update counter instead of the counter ID is specified, directly).

In the case where the update counter is held in the duplicate data base 238, the write operation into the external storage unit 136 is required each time the update counter is incremented or decremented by the update counter increment unit 232 or the update counter decrement unit 234. As a result, the process performance of the data base system DBS as a whole may be deteriorated.

In the case where the update request is issued less frequently from an application (client computer 100) or the write operation into the external storage unit 136 is sufficiently high in speed, however, the update counter may be stored directly into the duplicate data base 238 like in the second embodiment. By storing the update counter directly in the duplicate data base 238, the need of the update counter table 233 and the counter ID is eliminated, thereby leading to the advantages that the capacity of the main storage unit 134 is reduced while at the same time simplifying the increment/decrement process of the update counter.

Third Embodiment

A third embodiment of the invention is explained, below. The difference from the first and second embodiments is mainly explained, and the points shared by the first and second embodiments are not explained or only briefly explained.

A method called MVCC (Multi-Version Concurrency Control) is available to manage the data in the data base system DBS. According to MVCC, the data are managed by version, so that the data consistency can be held even in the case where the update and access process is executed without locking the data. As compared with the method in which the data consistency is held by locking, more transactions can be carried out at the same time for an improved throughput of the data base system DBS. According to the third embodiment, the information is managed equivalently to the update counter of the first and second embodiments by using the data managed by version.

The hardware configuration according to the third embodiment is identical with that of the first embodiment (FIG. 1).

Figure 28:
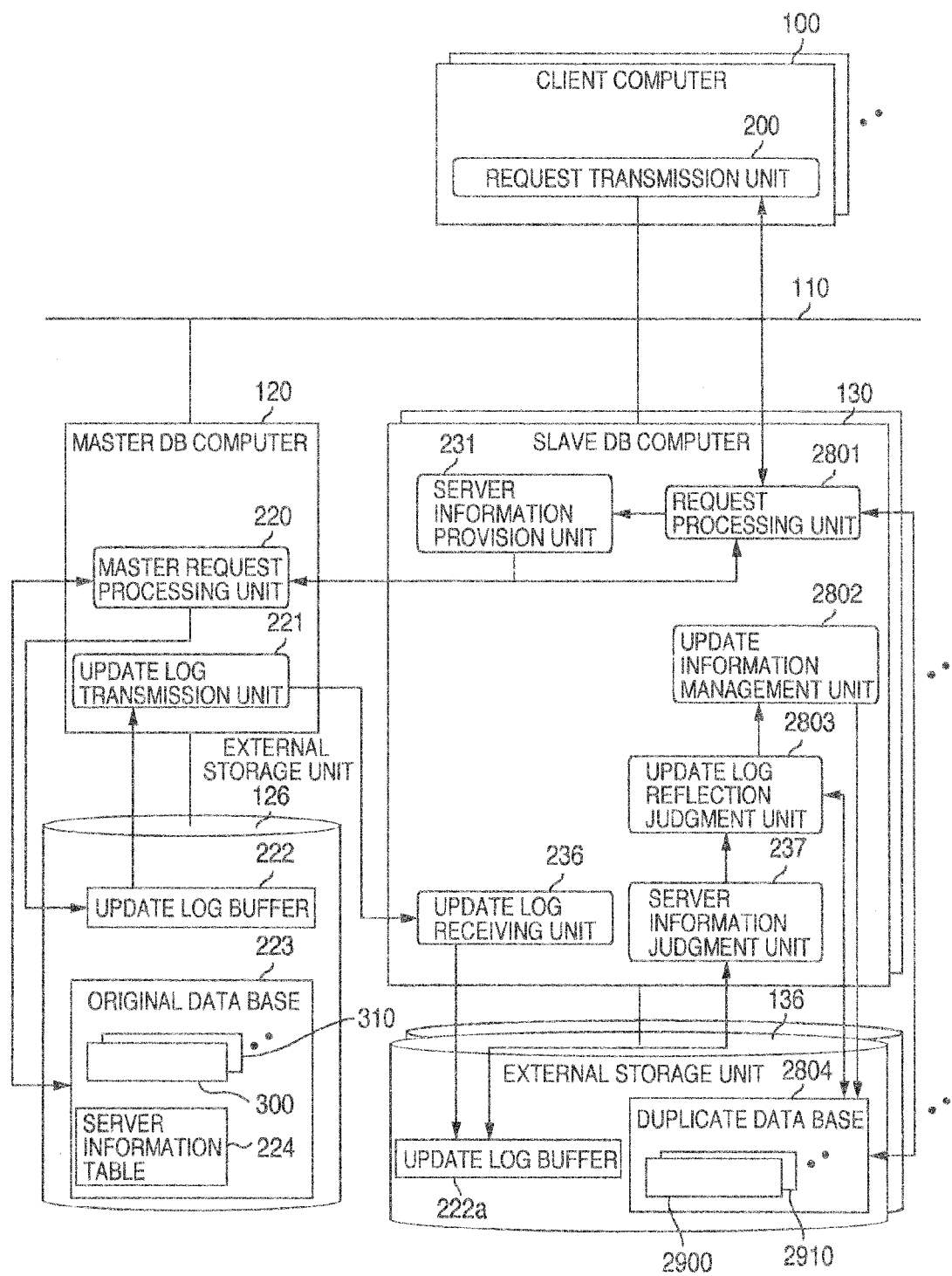
FIG. 28 is a diagram showing the module configuration according to a third embodiment of the invention.

The module configuration according to the third embodiment is explained with reference to FIG. 28. Incidentally, the same component parts as those shown in FIG. 2 are designated, by the same reference numerals, respectively, and not explained any further. The request processing unit 2801 accesses and updates the data (for example, the auction amount table 2900 and the update log-reflected pointer 2910 described later) of the duplicate data base 2804 according to the MVCC method. The update information management unit 2802 is accessed from the update log reflection judgment unit 2803, and the update log-reflected pointer corresponding to the row data to be updated, in the duplicate data base 2804 is changed as indicated by the next version. The update log reflection judgment unit 2803 judges whether the update log is reflected or not, based on the server information and the information of the update log-reflected pointer, and in the case where the update log is so reflected, updates the duplicate data base 2804.

Figure 29:
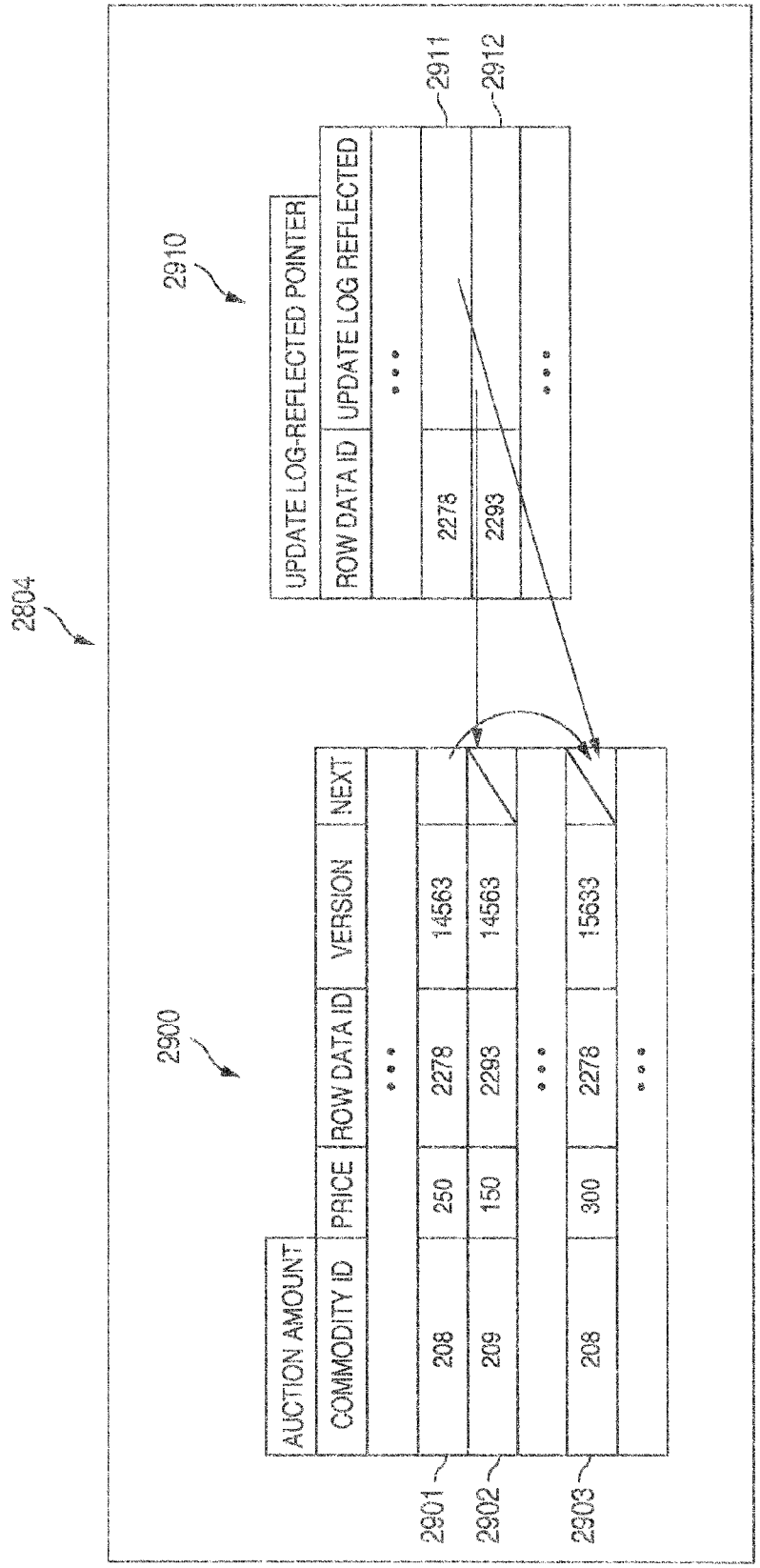
FIG. 29 shows a part of examples of the duplicate data base according to the third embodiment of the invention.

FIG. 29 shows a part of examples of the duplicate data base 2804. As shown in the auction amount table 2900, the "row data ID", the version number ("version") and the pointer to the next version ("next") making up the data for realizing MVCC for the row data in each table are added, as well as the "commodity ID" and the "price". Also, the update log-reflected pointer 2910 indicating the version with the update log reflected is held for each data ID. Incidentally, the update log-reflected pointer 2910 may be held in the main storage unit 134 of the local slave DB computer 130 instead of in the duplicate data base 2804.

Figure 30:
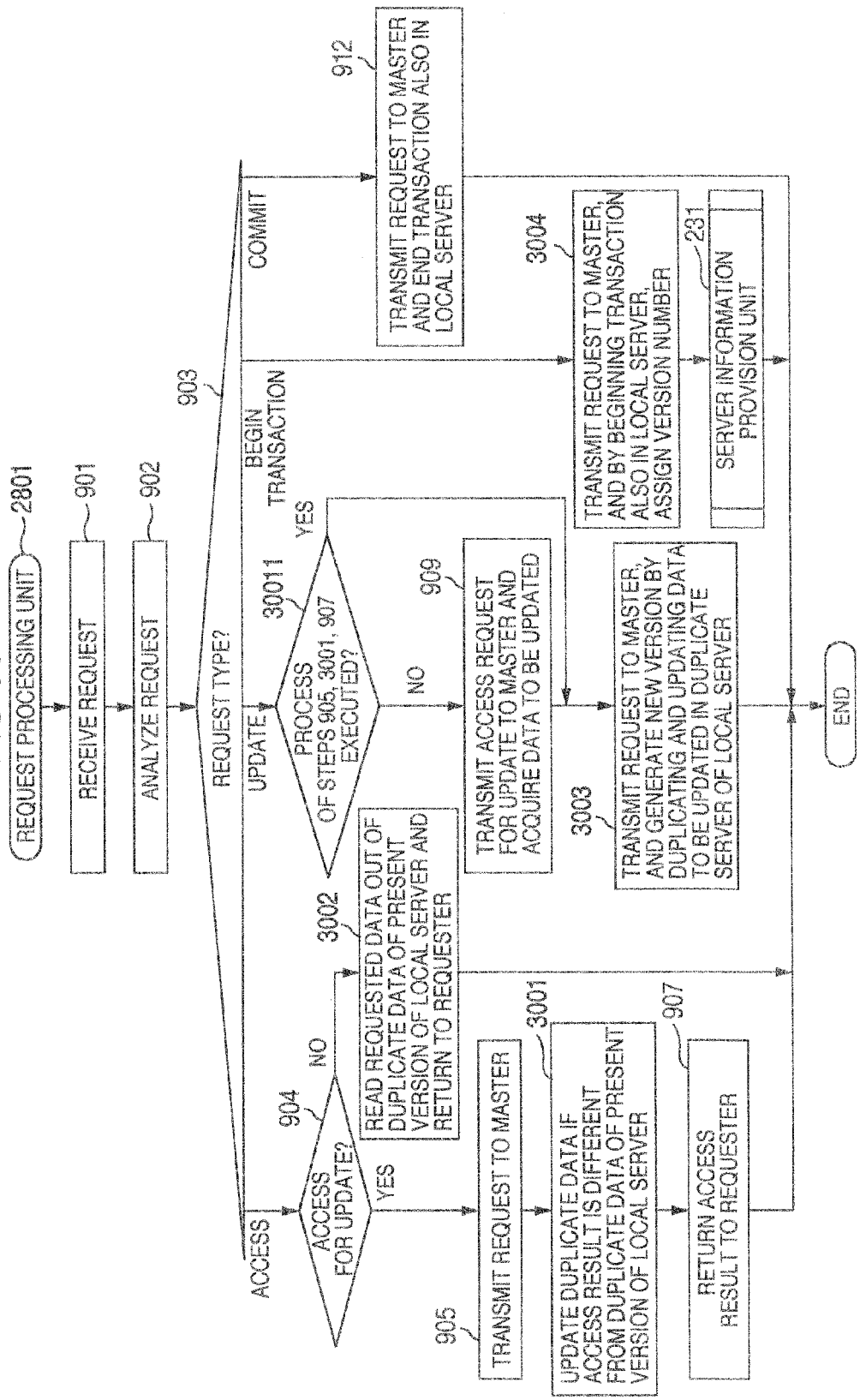
FIG. 30 is a flowchart showing the operation of the request processing unit according to the third embodiment of the invention.

FIG. 30 is a flowchart showing the operation of the request, processing unit 2801. Incidentally, the same process as in the flowchart shown in FIG. 9 is designated by the same reference numeral and not explained. The request processing unit 2801, upon acceptance of the transaction start request ("transaction start" in step 903), the request is transmitted to the master DB computer 120, and by thus starting the transaction, the version number is assigned to the particular transaction (step 3004). The version number is unique to each transaction, and larger for the transaction starting at a later time.

In processing the access request ("access" in step 903), assume that the answer in step 904 is NO. The request processing unit 2801 accesses only the data having the largest version number not larger than the version number of the present transaction (hereinafter referred to as the present version data) and returns it to the requester (step 3002).

In processing the update request ("update" in step 903), on the other hand, it is judged whether the process of steps 905, 3001, 907 is executed or not immediately before (step 30011), and in the case where the answer is NO, the process proceeds to step 909, while in the case where the answer is YES, the process proceeds to step 3003. In step 3003, the row data is not overwritten, but the original row data is duplicated and a new row data is generated. This data is updated and the version number of the present transaction is stored as the version number.

In processing the access request for update (YES In step 904), assume that after step 905, the data acquired from the master DB computer 120 is different from the data of the present version in the duplicate data base 2804 of the local server. Also in this case, the request processing unit 2801 executes the update process on the duplicate data base 2804 of the local server similarly to the update process of step 3003 (step 3001).

Figure 31:
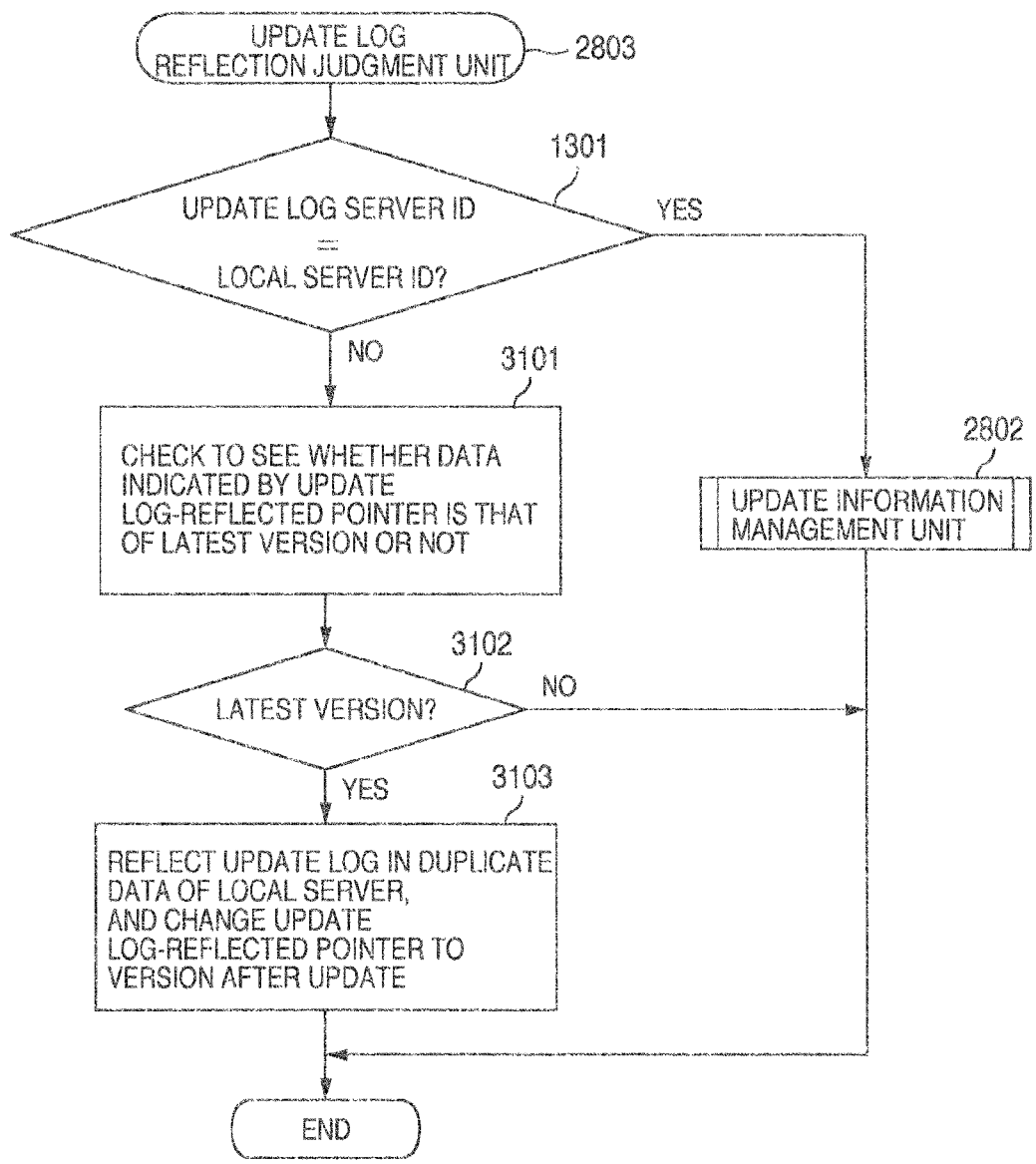
FIG. 31 is a flowchart showing the operation of the update log reflection judgment unit according to the third embodiment of the invention.
Figure 32:
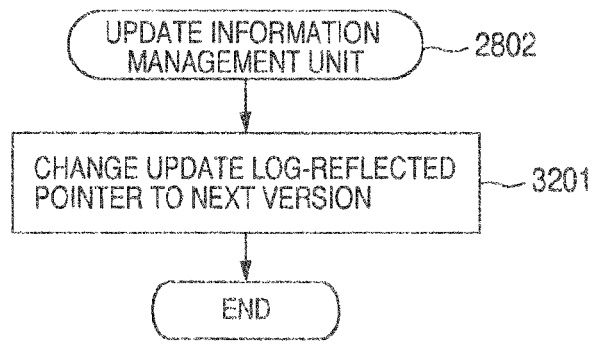
FIG. 32 is a flowchart showing the operation of the update information management unit according to the third embodiment of the invention.

FIG. 31 is a flowchart showing the operation of the update log reflection judgment unit 2803. Incidentally, the same processes as those in the flowchart of FIG. 13 are designated by the same reference numerals, respectively, and not explained or only briefly explained. In the case where the server ID of the update log is equal to the ID of the local server (YES in step 1301), the update log reflection judgment unit 2803 accesses the update information management unit 2802 so that an update log-reflected pointer corresponding to the row data ID of the data to be updated is changed to indicate the next version (the process of the update information management unit 2802 in step 3201 shown in FIG. 32).

In the case where the server ID of the update log is not equal, to the ID of the local server (NO in step 1301), the update log-reflected pointer corresponding to the row data ID of the data to be updated is checked to see whether it indicates the largest version (latest version) in the row data having the particular row data ID or not (step 3101). If not the latest version (NO in step 3102), the update log is not reflected but discarded, while if the latest version (YES in step 3102), on the other hand, the update log is reflected in the duplicate data base 2804 of the local server, and the update log-reflected pointer corresponding to the row data ID of the row data updated is changed to indicate the latest version (step 3103).

An outline of the process executed for access and update is explained below with reference to a specific example.

Assume that in the case where the data held in the duplicate data base 2804 is in the state shown in FIG. 29, the SQL query for access "SELECT*FROM auction amount WHERE commodity ID=208" is received. In the case where the version number of the transaction including the particular request is "14563" to "15632", then the request processing unit 2801 returns the row data 2901 as a result, and in the case where the version number is not smaller than "15633", returns the row data 2903 as a result.

Figure 33:
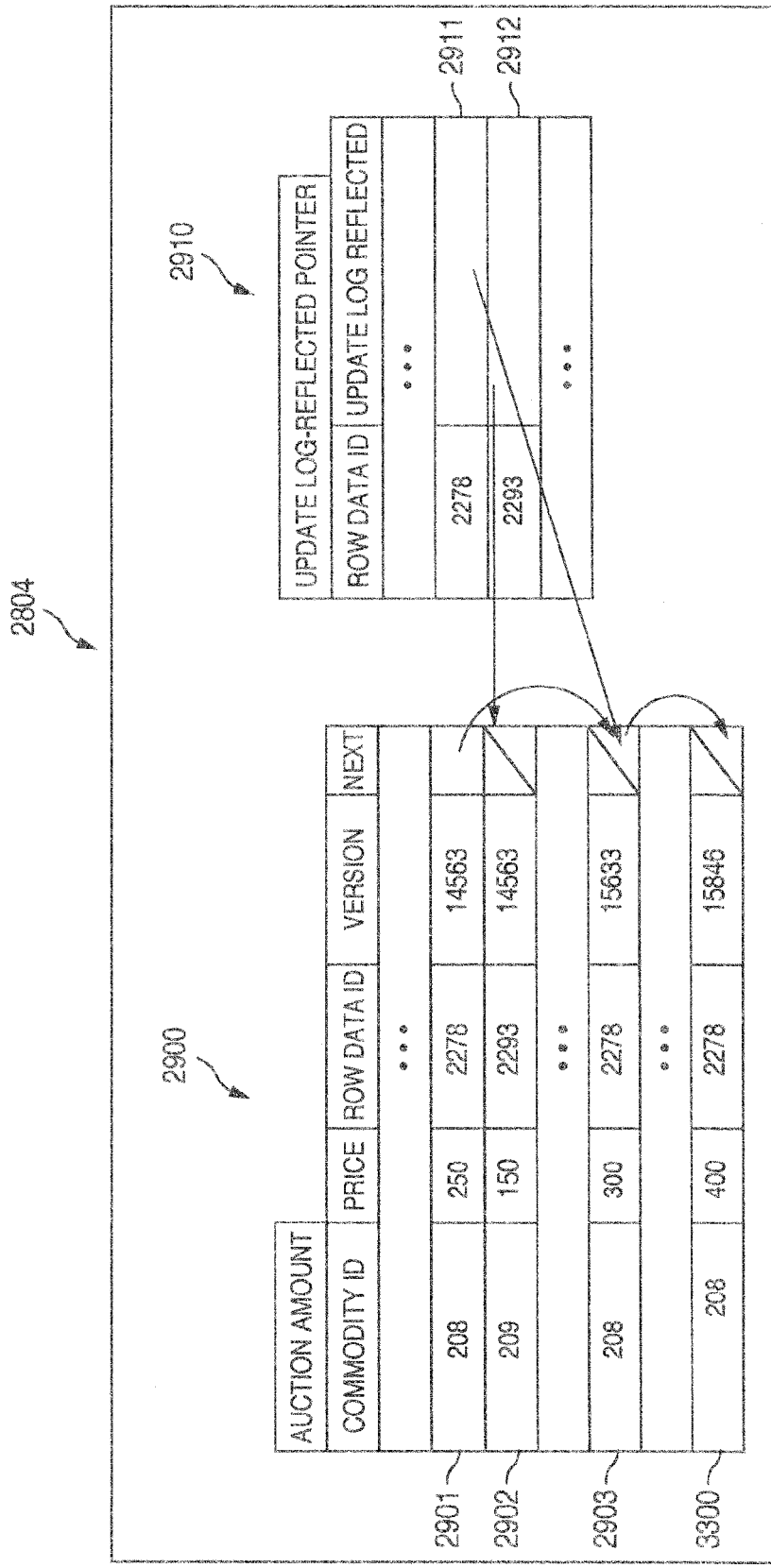
FIG. 33 shows a part of examples of the duplicate data base immediately after processing the update request according to the third embodiment of the invention.

Also, assume that In the case where the data held in the duplicate data base 2804 is in the state shown in FIG. 29, the SQL query for update "UPDATE auction amount SET price=price+100 WHERE commodity ID=208" is received. In the process, also assume that the version number of the transaction is "15846". The request processing unit 2801 duplicates the row data 2903, and by executing the update process on the particular data and storing "15846" as the version number, generates a new row data 3300. This is shown in FIG. 33. In the process, the update log-reflected pointer 2911 indicates the original row data 2903 and that the update log corresponding to the latest update request received by the local server is not yet received (corresponding to the case in which the update counter is "1" in the first embodiment). Also, in the case where the version number of the transaction including this request is not more than "15632", the update process fails and an error is returned.

Figure 34:
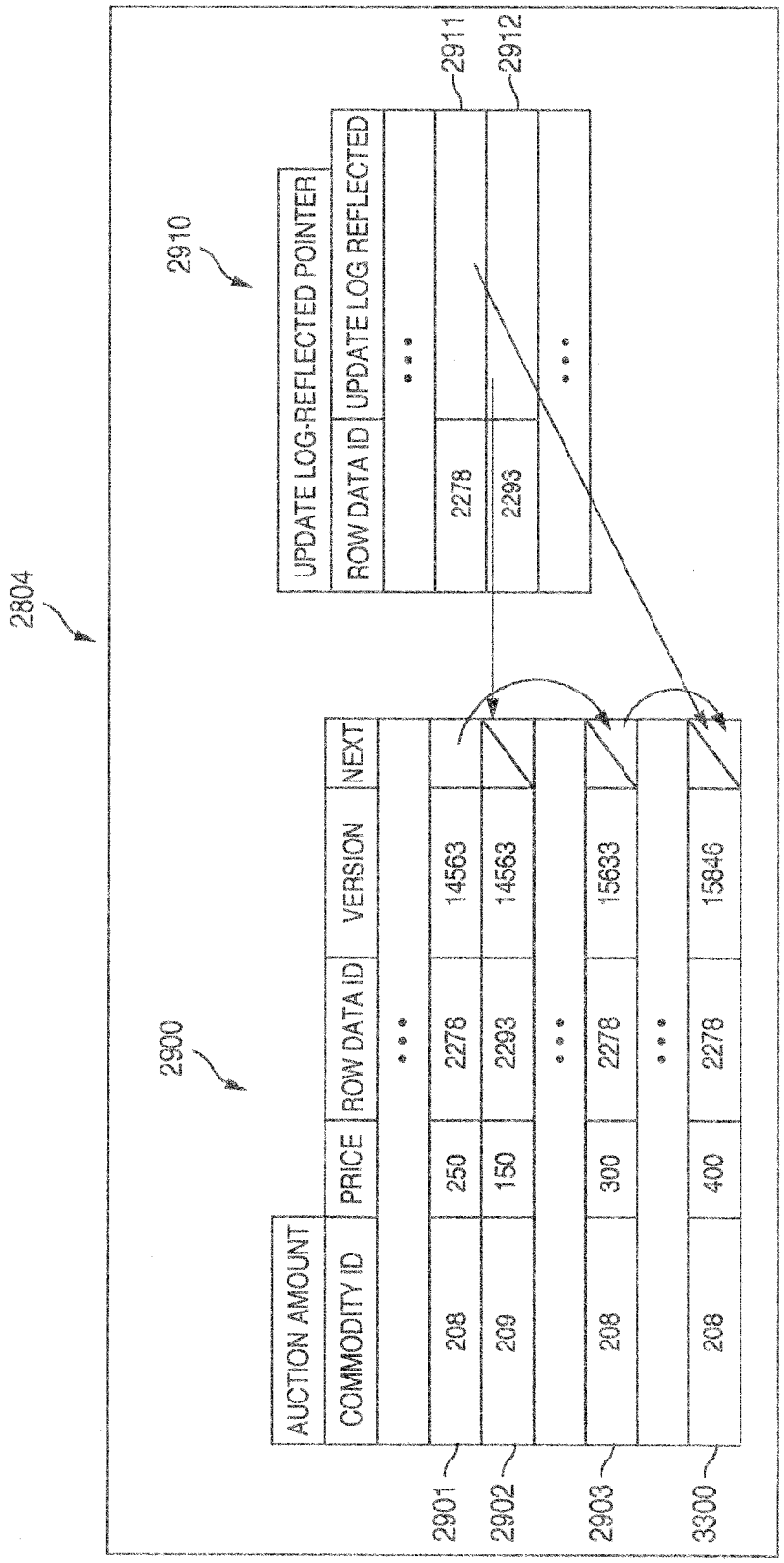
FIG. 34 shows a part of examples of the duplicate data base immediately after processing the update log according to the third embodiment of the invention.

After that, the update log reflection judgment unit 2803, upon acceptance of the update log corresponding to the update SQL query, accesses the update information management unit 2802 due to the coincidence between the server ID of the update log and the server ID of the local server, so that the update log-reflected pointer of the row data ID corresponding to the data to be updated Is changed to indicate the next version. This is shown in FIG. 34 (corresponding to the case in which the update counter is "0" in the first embodiment). In FIG. 34, the update log-reflected pointer 2911 indicates the latest row data 3300.

As described above, the information equivalent to the update counter shown in the first and second embodiments can be managed utilizing the data used by MVCC.

Fourth Embodiment

A fourth embodiment of the invention is explained below. The difference from the first to third embodiments is mainly described and the points shared also by the first to third embodiments are not explained or only briefly explained.

According to the first to third embodiments, the system is configured of the master DB computer 120 and at least one slave DB computer 130. According to the fourth embodiment, in contrast, the slave DB computer 130 is replaced by a data cache (cache memory system) stored in the main storage unit 104 of the client computer 100 and operated using the CPU 103 of the client computer 100.

Figure 35:
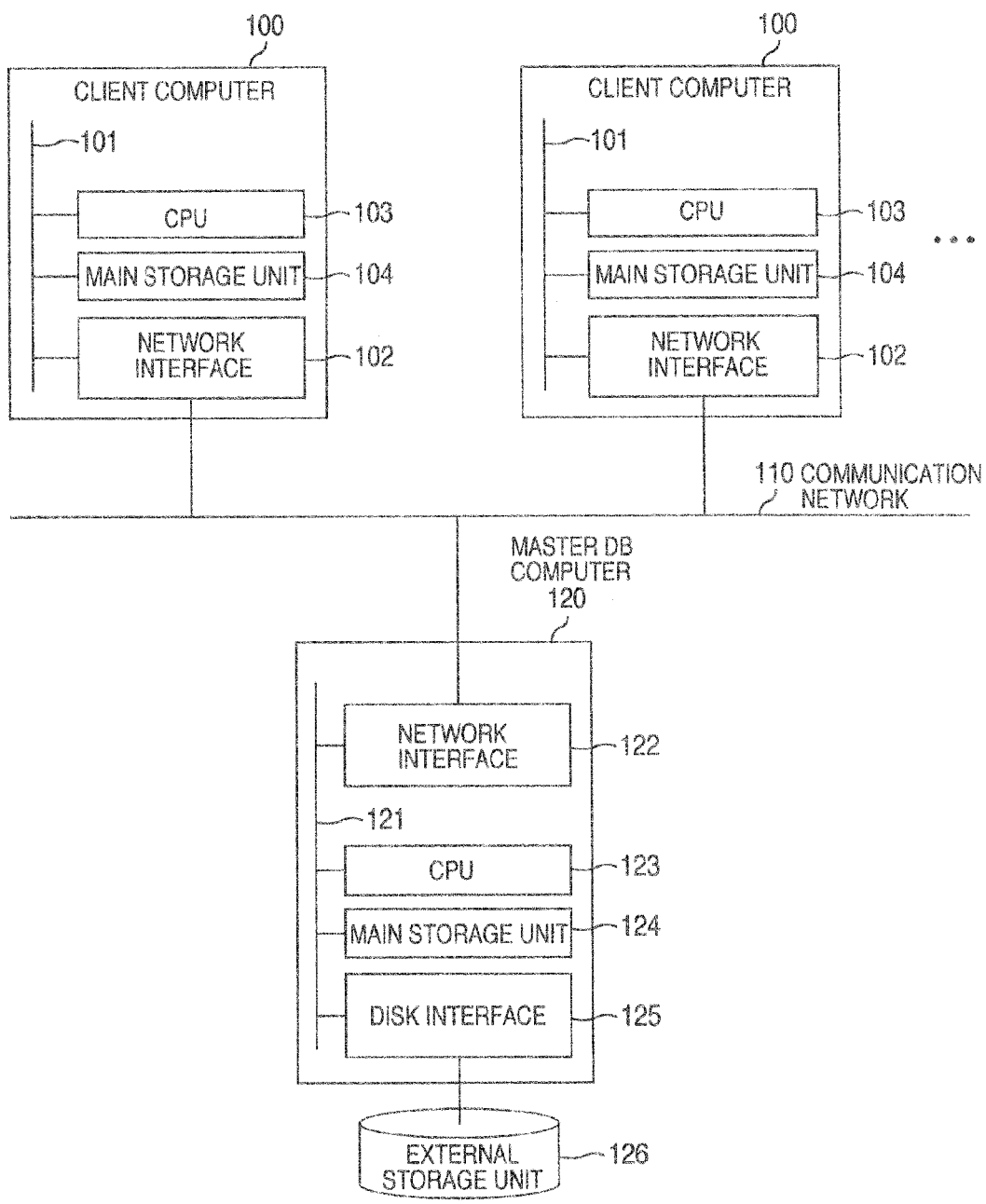
FIG. 35 is a diagram showing the hardware configuration according to a fourth embodiment of the invention.

The hardware configuration of the fourth embodiment is shown in FIG. 35. Incidentally, the same component parts as those in FIG. 1 are designated by the same reference numerals, respectively, and not explained any further. As shown in FIG. 35, the master DB computer 120 and at least one client computer 100 are connected to each other by a communication network 110. The data cache is stored in the main storage unit 104 of the client computer 100 and operated using the CPU 103. The application utilizing the data base system, is stored in the main, storage unit 104 of the client computer 100, and by operating using the CPU 103, transmits a request to the data, cache in the same client computer 100.

Figure 36:
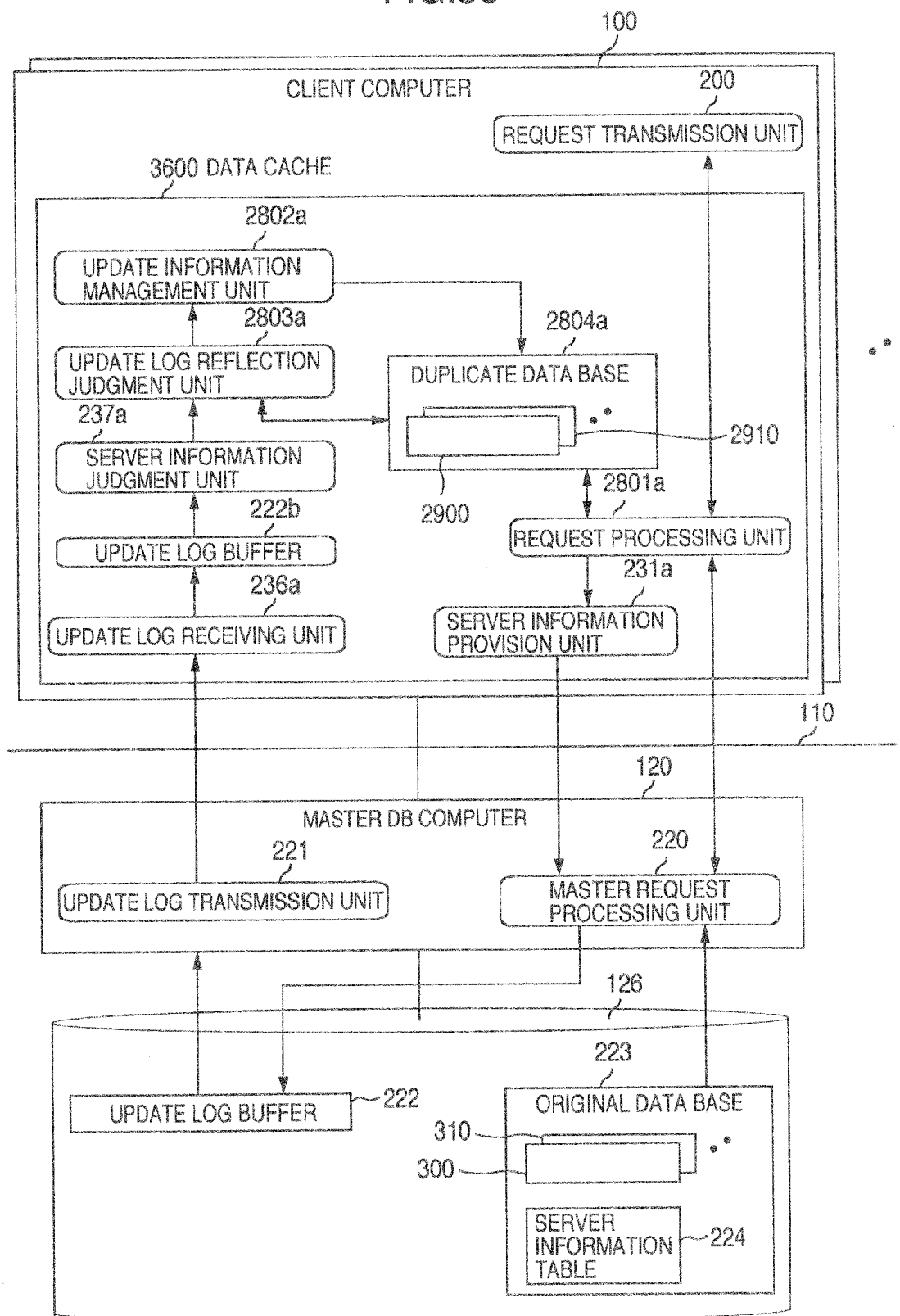
FIG. 36 is a diagram showing the module configuration according to the fourth embodiment of the invention.

The module configuration of the fourth embodiment is shown in FIG. 36. Incidentally, the same component parts as those in FIG. 28 (if located in the same position) are designated by the same reference numerals, respectively, or (if located in a different position) by the reference numerals with the affix "a" or "b" attached to the same reference numerals, respectively, as those shown in FIG. 28. The configuration shown in FIG. 36 is the same as that of the third, embodiment except that the former uses the data cache. The request transmission unit 200, which transmits/receives the data to and from an external computer (slave DB computer 130) through the communication network 110 in the third embodiment, transmits/receives the data to and from the data cache 3600 in the same computer in the fourth embodiment. The module in the data cache 3600 is substantially the same as the module in the slave DB computer 130 of the third embodiment.

The update log buffer 222*a* and the duplicate data base 2804 located in the external storage unit 136 according to the third embodiment are located in the main storage unit 104 according to the fourth embodiment. Incidentally, the data cache 3600 may be a process either independent of or identical with the application. In the case where the data cache 3600 is a process independent of the application, the request transmission unit 200 and the request processing unit 2801*a* transmit/receive the data to each other by inter-process communication. In the case where the data cache 3600 is the process identical with the application, on the other hand, the request transmission unit 200 and the request processing unit 2801*a* transmit/receive the data to each other by accessing the procedure.

Also, the configuration of the first and second embodiments using the data cache can be realized in similar manner to the configuration described above.

As described above, the system can be configured of the master DB computer 120 and the data cache operated in at least one client computer 100.

Generally, the main storage unit (the main storage unit 104, etc.) is smaller in storage capacity than, the external storage unit (the external storage unit 136, etc.), and the duplicate data base (the duplicate data base 2804*a*, etc.) often requiring a large capacity may not be easily stored in the main storage unit. In recent years, however, the capacity of the main storage unit has so increased (for example, to about several gigabytes) that a large capacity of data can now be stored also in the main storage unit. In that case, the system, according to the fourth embodiment is also considered applicable in real terms.

The main storage unit Is lower in operating speed than the external storage unit, and therefore, the use of the data cache for storing the duplicate data base in the main storage unit is expected to improve the throughput of the data base.

According to the fourth embodiment, the system can be realized in which the data cache held in the main storage unit 104 of the client computer 100 is used for the duplicate data base in place of the slave DB computer 130. As a result, the communication speed can be increased between the request transmission unit 200 and the request processing unit 2801*a* which are located in the same client computer 100 and can communicate with each other without intermediation of the communication network 110. Thus, the process speed is increased especially in the case where a series of jobs (called the session) are carried out by the same user in the system such as the Web service.

The embodiments of the invention are explained, above. This invention, however, is not limited to these embodiments and can be embodied within the same scope without changing the spirit thereof. The specific configuration of hardware and software can be also appropriately changed without departing from the spirit and scope of the invention.

The invention claimed is:

1. An information processing system comprising:
a first information processing unit for managing an original database constituting a mass of data; and
a plurality of second information processing units, each of the plurality of second information processing units managing a respective duplicate database, of a plurality of duplicate databases, each respective duplicate database constituting a duplicate of the original database,
wherein an update log storing update information generated in the original database of the first information processing unit is transmitted to each of the plurality of second information processing units and reflected in each of the respective duplicate databases,
wherein each of the plurality of second information processing units includes:
a request processing unit, which upon acceptance of an update request from an external computer, that is not the first information processing unit or any of the plurality of second information processing units, transmits the update request to the first information processing unit to update the original database while at the same time updating each of the respective duplicate databases of each of the plurality of second information processing units;
an update information management unit for checking, for each data in each of the respective duplicate databases, whether the update log corresponding to the update request accepted from the external computer is received from the first information processing unit or not; and
an update reflection determination unit, which upon acceptance of a new update log from the first information processing unit, makes a determination of whether the new update log is newer than the update request accepted from the external computer, based on the information stored in the new update log and the information managed by the update information management unit, and reflects the update content of the new update log in each of the respective duplicate databases, when, as a result of the determination, the new log is newer than the update request accepted from the external computer.

2. The information processing system according to claim 1, wherein the first information processing unit is a first database computer and each of the plurality of second information processing units is a second database computer.

3. The information processing system according to claim 2, wherein the update information management unit includes:
an update counter table for storing a counter corresponding to each data in each of the respective duplicate databases;
an update counter increment unit for incrementing, by a predetermined number, the count on the counter corresponding to the data to be updated in the update counter table, at the time of updating each of the respective duplicate databases when processing the update request in each respective second database computer; and
an update counter decrement unit which, upon reception from the first database computer the update log corresponding to the update request received from the external computer by each respective second database computer, decrements, by a predetermined number, the count on the counter corresponding to the data to be updated in the update counter table,
wherein the update reflection determination unit, upon reception of a new update log from the first database computer, accesses the update counter table, and when the count on the counter corresponding to the data to be updated is not greater than a predetermined value, reflects the update content of the update log in each of the respective duplicate databases of each respective second database computer.

4. The information processing system according to claim 2,
wherein a counter corresponding to each data is stored in each of the respective duplicate databases of each respective second database computer in addition to the duplicate of the original database,
wherein the update information management unit includes:
an update counter increment unit for incrementing, by a predetermined number, the count on the counter corresponding to the data to be updated in each of the respective duplicate databases, at the time of updating the each of the respective duplicate databases when processing the update request in each respective second database computer; and
an update counter decrement unit, which upon reception from the first database computer an update log corresponding to the update request received from the external computer by the second database computer, decrements, by a predetermined number, the count on the counter corresponding to the data to be updated in each of the respective duplicate databases, and
wherein the update reflection determination unit, upon acceptance of a new update log from the first database computer, accesses the update counter table, and when the count on the counter corresponding to the data to be updated is not greater than a predetermined value, reflects the update content of the update log in each of the respective duplicate databases of each respective second database computer.

5. The information processing system according to claim 2, wherein each respective second database computer manages a version of the update of the data stored in each of the respective duplicate databases, and the update log-reflected pointer indicating the version that has reflected the update log is stored in each of the respective duplicate databases for the data managed by the version, wherein the request processing unit, at the time of updating each of the respective duplicate databases, duplicates the data to be updated and generates the data of the next version by updating the value of the data, wherein the update information management unit, upon reception from the first database computer an update log corresponding to the update request received from an external computer by the second database computer, changes, to the next version, the update log-reflected pointer corresponding to the data to be updated in each of the respective duplicate databases, and wherein the update reflection determination unit, upon acceptance of a new update log from the first database computer, accesses each of the respective duplicate databases, and when the update log-reflected pointer corresponding to the data to be updated is the latest version, reflects the update content of the update log in each of the respective duplicate databases of each respective second database computer.

6. The information processing system according to claim 2, wherein a server information table for storing the information on each respective second database computer is stored in the original database of the first database computer, and wherein each respective second database computer includes:

a server information provision unit for transmitting, to the first database computer, an update request for updating, in the server information table, the information on each respective second database computer stored in the server information table; and a server information determination unit for acquiring the information on each respective second database computer from the update log data to update the server information table in the update log received from the first database computer, and determining whether the particular update log corresponds to the update request received by each respective second database computer or not.

7. A data update method for an information processing system, the information processing system comprising a database computer for managing an original database constituting a mass of data, and a plurality of client computers, each of the plurality of client computers having a respective data cache, of a plurality of data caches, each respective data cache for storing a respective duplicate database as a copy of the original database in a main storage unit, the method comprising:

transmitting an update log storing update information generated in the original database of the database computer to each of the respective data caches of each of the plurality of client computers, and reflecting the update log in the respective duplicate database, wherein each of the plurality of data caches includes a request processing unit, an update information management unit, and an update reflection determination unit;

transmitting, by the request processing unit, upon acceptance of a data update request from an external computer, that is not the database computer or any of the plurality of client computers, the update request to the database computer to update the original database while at the same time updating each of the respective duplicate databases;

checking, by the update information management unit, for each data in each of the respective duplicate databases, whether the update log corresponding to the update request accepted from the external computer is received from the database computer or not; and making a determination, by the update reflection determination unit, upon acceptance of a new update log from the database computer, whether the new update log is newer than the update request accepted from the external computer, based on the information stored in the new update log and the information managed by the update information management unit, and reflecting the update content of the new update log in each of the respective duplicate databases, when, as a result of the determination, the new log is newer than the update request accepted from the external computer.

8. The data update method according to claim 7, wherein the update information management unit includes an update counter table for storing the counter corresponding to each of the data in each of the respective duplicate databases, an update counter increment unit, and an update counter decrement unit, wherein the method further comprises:

incrementing, by the update counter increment unit, at the time of updating each of the respective duplicate databases when processing the update request, by a predetermined number, the count on the counter corresponding to the data to be updated in the update counter table;

decrementing, by the update counter decrement unit, upon reception from the database computer the update log corresponding to the update request received from the external computer, by a predetermined number, the count on the counter corresponding to the data to be updated in the update counter table; and accessing, by the update reflection determination unit, upon acceptance of a new update log from the database computer, the update counter table, and when the count on the counter corresponding to the data to be updated is not greater than a predetermined value, reflecting the update content of the update log in each of the respective duplicate databases.

9. The data update method according to claim 7, wherein a counter corresponding to each data is stored in each of the respective duplicate databases of each of the respective data caches in addition to the duplicate of the original database, wherein the update information management unit includes an update counter increment unit and an update counter decrement unit, and wherein the method further comprises:

incrementing, by the update counter increment unit, at the time of updating each of the respective duplicate databases when processing the update request, by a predetermined number, the count on the counter corresponding to the data to be updated in each of the respective duplicate databases;

decrementing, by the update counter decrement unit, upon reception of an update log corresponding to the update request from the database computer, by a predetermined number, the count on the counter corresponding to the data to be updated in each of the respective duplicate databases; and accessing, by the update reflection determination unit, upon acceptance of a new update log from the database computer, the update counter table, and when the count on the counter corresponding to the data to be updated is not greater than a predetermined value, reflecting the update content of the update log in each of the respective duplicate databases.

10. The data update method according to claim 7, wherein the update of the data stored in each of the respective duplicate databases is managed by a version of the update, wherein the update log-reflected pointer indicating the version with the update log reflected for the data managed by the version is stored in each of the respective duplicate databases, wherein the method further comprises:

duplicating, by the request processing unit, at the time of updating each of the respective duplicate databases, the data to be updated, and by updating the value of the data, generating the data of the next version;

changing, by the update information management unit, upon reception of an update log corresponding to the update request from the database computer, to the next version the update log-reflected pointer corresponding to the data to be updated in each of the respective duplicate databases; and accessing, by the update reflection determination unit, upon acceptance of a new update log from the database computer, each of the respective duplicate databases, and when the update log-reflected pointer corresponding to the data to be updated is the latest version, reflecting the update content of the update log in each of the respective duplicate databases.

11. The data update method according to claim 7, wherein a server information table storing the information on each respective data cache is stored in the original database, wherein each respective data cache includes a server information provision unit and a server information determination unit, and wherein the method further comprises:

transmitting, by the server information provision unit, an update request to the database computer to update, in the server information table, the information on each respective data cache stored in the server information table; and acquiring, by the server information determination unit, the information on each respective data cache from the update log data for updating the server information table in the update log received from the database computer, and determining whether the update log corresponds to the update request received by each respective data cache.

12. A data update program, the data update program being tangibly embodied on a non-transitory computer readable storage medium, and when executed, the data update program causes a computer to carry out the data update method described in claim 11.

\* \* \* \* \*